United States Patent
Yashima

(10) Patent No.: US 10,708,460 B2
(45) Date of Patent: Jul. 7, 2020

(54) IMAGE FORMING APPARATUS

(71) Applicant: SHARP KABUSHIKI KAISHA, Sakai, Osaka (JP)

(72) Inventor: Daiki Yashima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/292,734

(22) Filed: Mar. 5, 2019

(65) Prior Publication Data

US 2019/0281177 A1  Sep. 12, 2019

(30) Foreign Application Priority Data

Mar. 9, 2018 (JP) .............................. 2018-042981

(51) Int. Cl.
*H04N 1/00* (2006.01)
*G08B 13/22* (2006.01)
*H04N 1/44* (2006.01)

(52) U.S. Cl.
CPC ......... *H04N 1/00925* (2013.01); *G08B 13/22* (2013.01); *H04N 1/00323* (2013.01); *H04N 1/00697* (2013.01); *H04N 1/4433* (2013.01); *H04N 2201/0094* (2013.01)

(58) Field of Classification Search
CPC ........... H04N 1/00925; H04N 1/00323; H04N 1/00697; H04N 1/4433; H04N 2201/0094; G08B 13/22
USPC .......................................................... 358/1.13
See application file for complete search history.

(56) References Cited

U.S. PATENT DOCUMENTS

2017/0142278 A1* 5/2017 Tanaka ................... H04N 1/113
2018/0157449 A1* 6/2018 Nobutani ............. G06K 9/0002

FOREIGN PATENT DOCUMENTS

JP  2007-079692 A  3/2007
JP  2015-133028 A  7/2015

* cited by examiner

*Primary Examiner* — Saeid Ebrahimi Dehkordy
(74) *Attorney, Agent, or Firm* — ScienBiziP, P.C.

(57) ABSTRACT

An image forming apparatus includes an intruder detecting unit that detects an intruder, a notification unit that notifies detection of the intruder, an intruder detection mode execution unit that executes an intruder detection mode to cause the notification unit to notify the detection of the intruder if the intruder is detected with the intruder detecting unit operating, a job reception unit that receives an instruction to perform a job, and an image forming unit that forms an image. The intruder detection mode execution unit suspends the intruder detection mode for a predetermined suspension time period if the job reception unit receives the instruction to perform a predetermined specific job while the intruder detection mode execution unit executes the intruder detection mode.

7 Claims, 24 Drawing Sheets

IMAGE FORMING APPARATUS

BACKGROUND

1. Field

The present disclosure relates to an image forming apparatus.

2. Description of the Related Art

Many of multifunction apparatuses have a power saving mode available to save power in addition to a standard operation mode. A typical multifunction apparatus having the power saving mode includes a human-body detecting device, such as a human-body detecting sensor, and an imaging device, such as a camera, and is thus automatically switched between the standard operation mode and the power saving mode. Upon detecting a human, the multifunction apparatus reverts from the power saving mode to the standard operation mode in a typical related art operation.

In a multifunction apparatus of the related art, an intruder detection function is implemented by using as a security system the human-body detecting device and the imaging device in the multifunction apparatus. The intruder detection function may include notifying a user of the presence of an intruder or beeping a warning sound if the human-body detecting device detects an intruder in an intruder detection mode.

Japanese Unexamined Patent Application Publication No. 2007-79692 discloses a multifunction apparatus having such an intruder detection function. The multifunction apparatus includes a sensor detecting a human, and is connected to a control apparatus via a network. The multifunction apparatus further includes a unit that notifies the control apparatus of detection results if the sensor has detected a human body. Japanese Unexamined Patent Application Publication No. 2015-133028 discloses an image forming apparatus. The image forming apparatus includes an imaging unit that takes a picture of a predetermined monitoring area, a human detection unit that detects a human with the image forming apparatus operating at power lower than power that the image forming apparatus consumes in the normal operation thereof, and a switching unit that switchably selects of one of a first waiting mode and a second waiting mode. In the first waiting mode, power fed to the imaging unit is sufficient for the imaging unit to take the picture of the predetermined monitoring area when the human detection unit detects a human, and in the second waiting mode, power fed to the imaging unit is sufficient for the image unit to take the picture of the predetermined monitoring area regardless of whether the human detection unit outputs detection results.

If an authorized user is detected in the intruder detection mode, the authorized user may be reported as an intruder uniformly, or a warning sound may be beeped. The authorized user is thus mistaken for an intruder. This leads to inconvenience to users.

It is desirable to provide a user-friendly image forming apparatus that is free from inconvenience in which an authorized user is treated as a target about which reporting or warning is made in the intruder detection mode.

SUMMARY

According to an aspect of the disclosure, there is provided an image forming apparatus. The image forming apparatus includes an intruder detecting unit that detects an intruder, a notification unit that notifies detection of the intruder, an intruder detection mode execution unit that executes an intruder detection mode to cause the notification unit to notify the detection of the intruder if the intruder is detected with the intruder detecting unit operating, a job reception unit that receives an instruction to perform a job, and an image forming unit that forms an image. The intruder detection mode execution unit suspends the intruder detection mode for a predetermined suspension time period if the job reception unit receives the instruction to perform a predetermined specific job while the intruder detection mode execution unit executes the intruder detection mode.

DESCRIPTION OF THE EMBODIMENTS

Embodiments of the disclosure are described below in connection with the drawings. The embodiments of the disclosure are described for exemplary purposes only, and the description thereof is not intended to limit the disclosure.

First Embodiment

Figure 1:
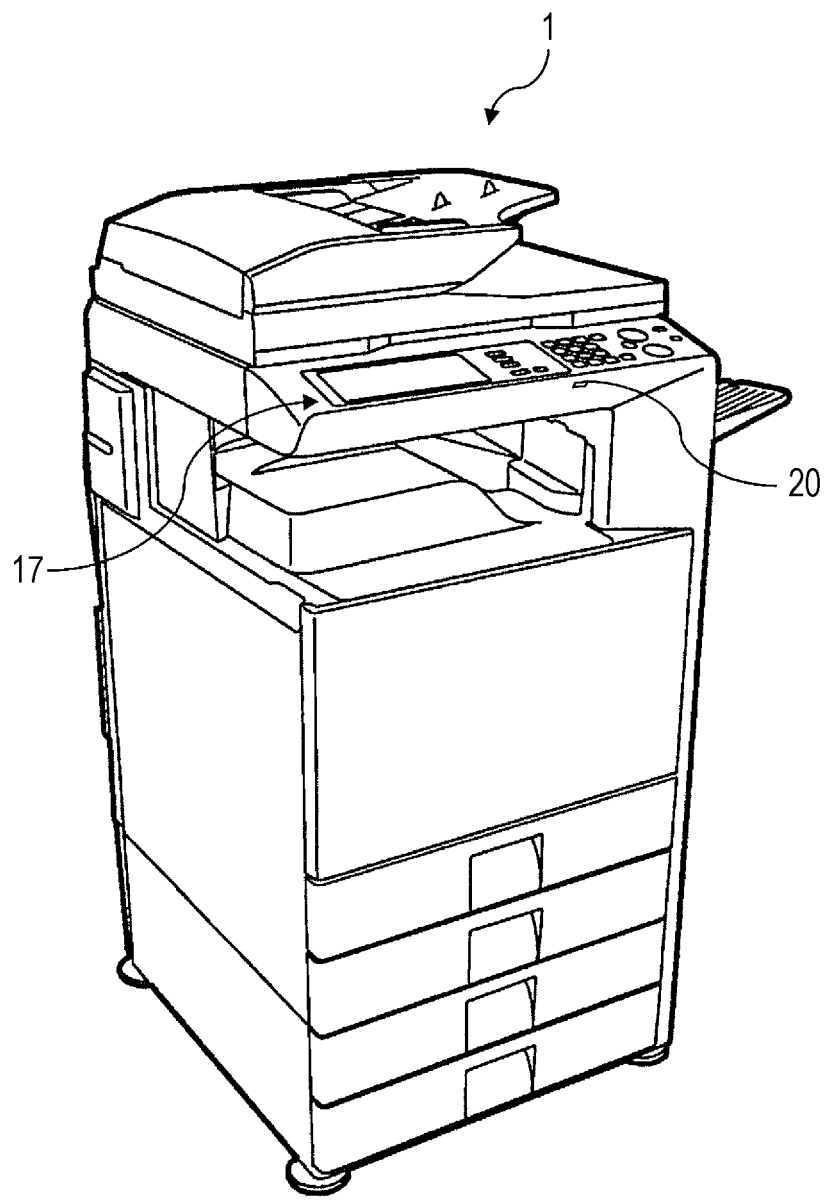
FIG. 1 is an external perspective view of a digital multifunction apparatus as an image forming apparatus of an embodiment of the disclosure.
Figure 2:
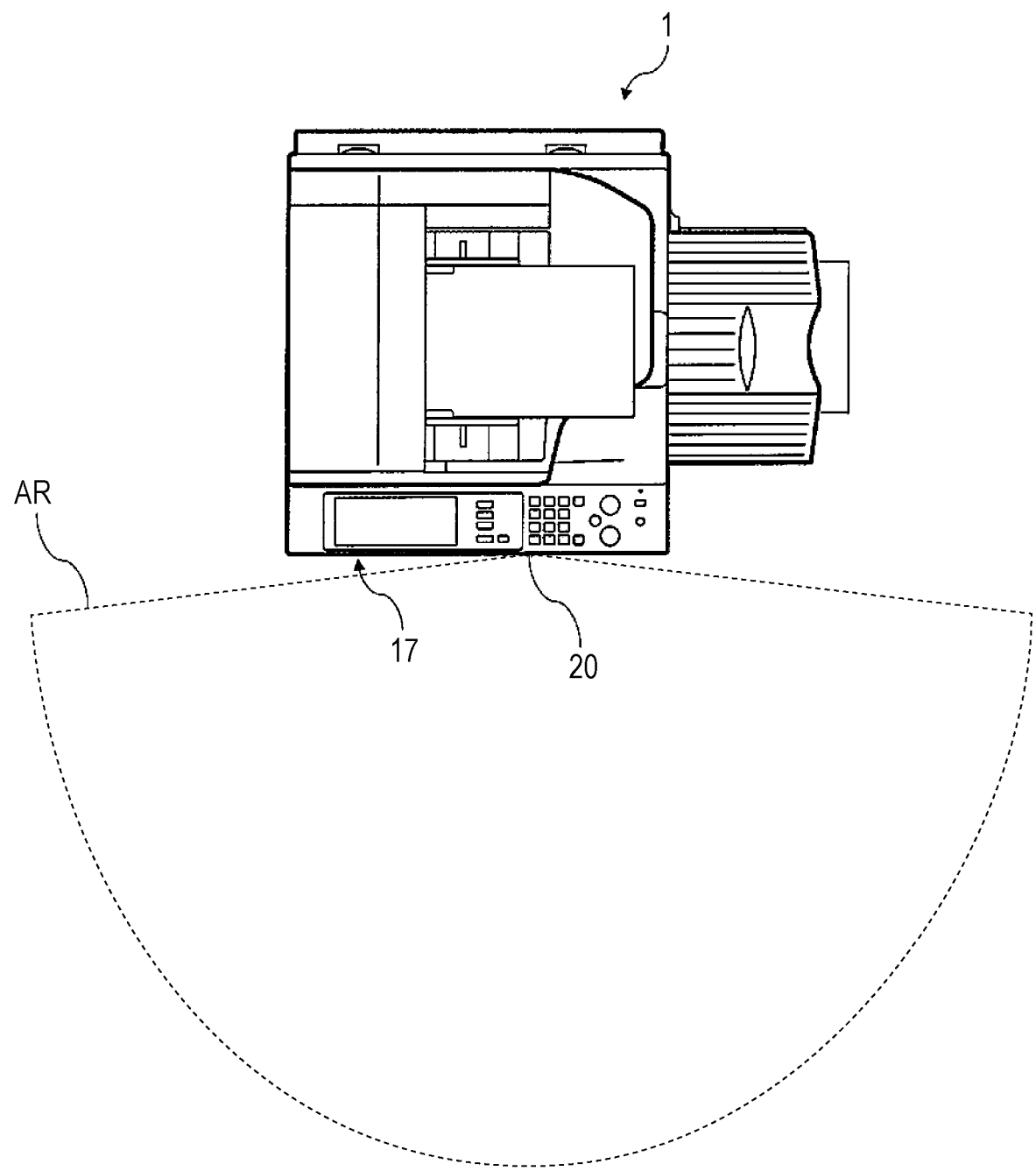
FIG. 2 is a plan view of the digital multifunction apparatus of FIG. 1.
Figure 3:
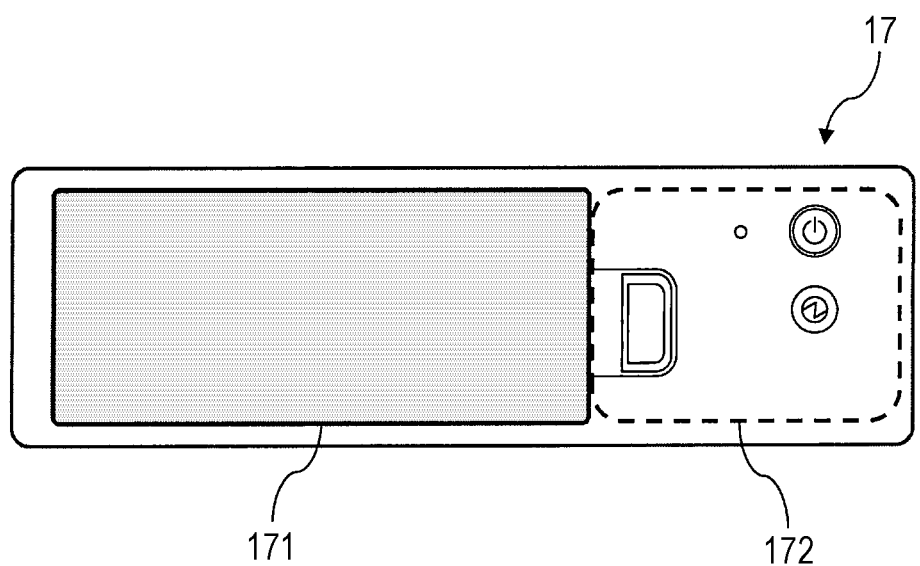
FIG. 3 illustrates a panel unit of the digital multifunction apparatus of FIG. 1.
Figure 4:
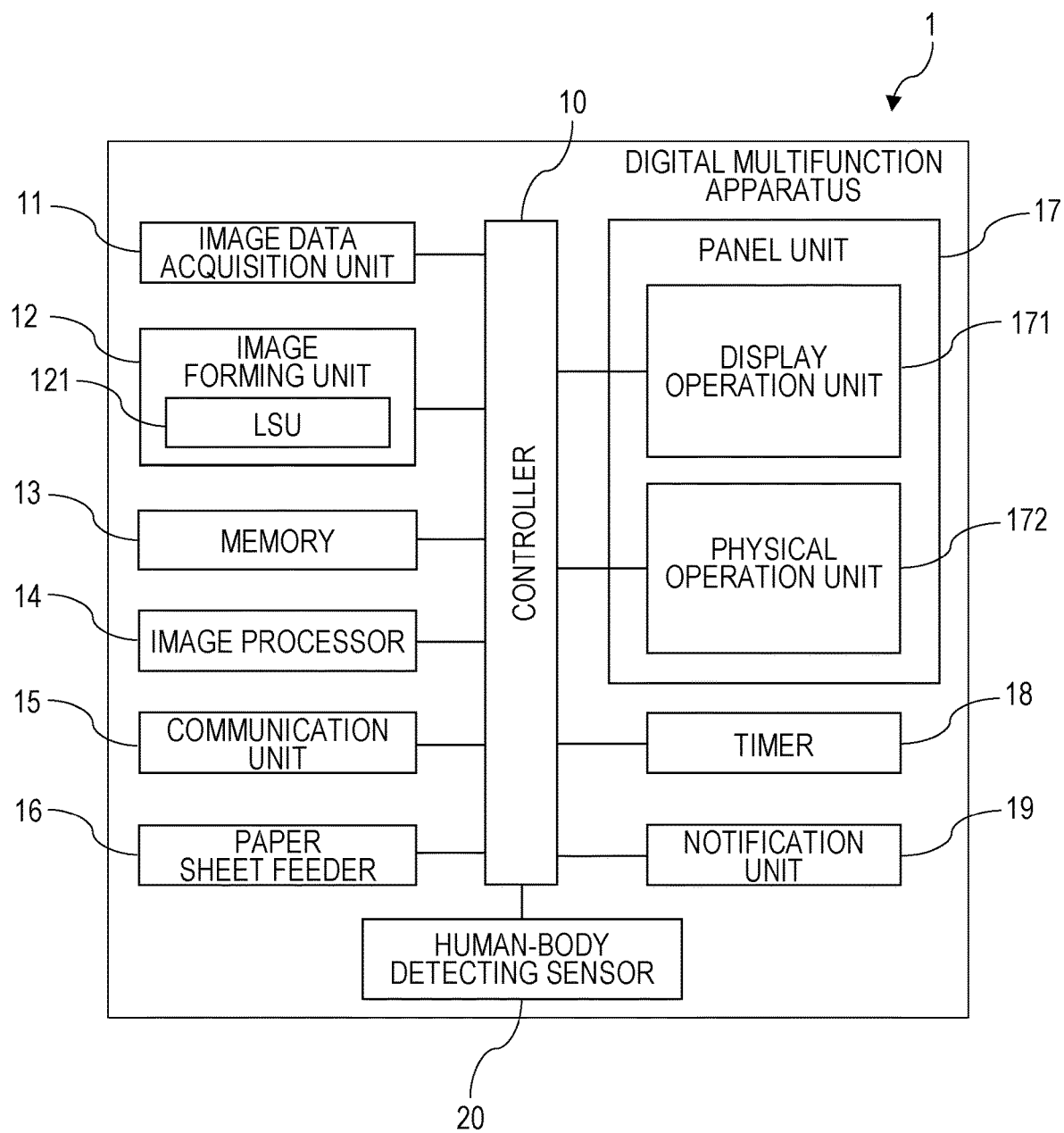
FIG. 4 is a block diagram generally illustrating the digital multifunction apparatus of FIG. 1.

An digital multifunction apparatus 1 functioning as an image forming apparatus of a first embodiment of the disclosure is described below in connection with FIGS. 1 through 4. FIG. 1 is an external perspective view of the digital multifunction apparatus 1 functioning as the image forming apparatus of the first embodiment of the disclosure. FIG. 2 is a plan view of the digital multifunction apparatus 1 of FIG. 1. FIG. 3 illustrates a panel unit 17 in the image forming apparatus 1 of FIG. 1. FIG. 4 is a block diagram generally illustrating the digital multifunction apparatus 1 of FIG. 1.

The digital multifunction apparatus 1 may be a multifunction apparatus or a multifunction peripheral (MFP) that digitally processes image data and has a copying function, a scanning function, and a facsimile function.

Referring to FIGS. 1 and 2, the digital multifunction apparatus 1 includes the panel unit 17, and a human-body detecting sensor 20 on the front portion of the panel unit 17. Referring to FIG. 3, the panel unit 17 includes a display operation unit 171 and a physical operation unit 172.

The configuration of the digital multifunction apparatus 1 is simply described first in connection with FIG. 4. Referring to FIG. 4, the digital multifunction apparatus 1 includes a controller 10, an image data acquisition unit 11, an image forming unit 12, a memory 13, an image processor 14, a communication unit 15, a paper sheet feeder 16, a panel unit 17, a timer 18, a notification unit 19, and a human-body detecting sensor 20. The elements of the digital multifunction apparatus 1 are described below.

The controller 10 generally controls the digital multifunction apparatus 1, and includes a central processing unit (CPU), a random-access memory (RAM), a read-only memory (ROM), and a variety of interface circuits. To generally control the digital multifunction apparatus 1, the controller 10 performs detection using sensors, and monitors and controls a variety of loads, including a motor, a clutch, and the panel unit 17.

The image data acquisition unit 11 detects and reads an original document placed on a document platen or an original document transported from an original document tray, and generates image data. Also, the image data acquisition unit 11 acquires image data generated in an external information processing apparatus (not illustrated) or a facsimile (fax) device (not illustrated). To acquire the image data from the external information processing apparatus or the like, the image data may be acquired via a wired or wireless network, or using a universal serial bus (USB) having the image data recorded thereon, or using a combination thereof.

The image forming unit 12 outputs the image data, acquired by the image data acquisition unit 11 and processed by the image processor 14, in a printed form on a paper sheet. The image forming unit 12 includes a laser scanning unit (LSU) 121. The LSU 121 irradiates the surface of a photoconductor drum in a charged state with a laser light beam corresponding to information in the image data, namely, a digital signal, and thus forms an electrostatic latent image.

The memory 13 is an element or a storage medium that stores a control program and information used to implement a variety of functions of the digital multifunction apparatus 1. The memory 13 may be a semiconductor device, such as a RAM or a ROM, a hard disk, a flash memory, or a solid state semiconductor drive (SSD). The program and data may be stored on separate devices, for example, a region storing data may be the hard disk drive, and a region storing the program may be a flash memory.

The image processor 14 converts an original document image read by the image data acquisition unit 11 into an appropriate electrical signal, thereby generating the image data. The image processor 14 thus processes the image data input from the image data acquisition unit 11 to output an expanded image or contacted image in response to an instruction from the display operation unit 171.

The communication unit 15 communicates with an external image forming apparatus 2, a computer, a mobile information terminal, an information processing apparatus, a facsimile device, and the like via the network 3. The communication unit 15 thus transmits or receives a variety of information including mails and facsimile (FAX) data to or from the external device, such as the external image forming apparatus 2.

The paper sheet feeder 16 transports a paper sheet placed in a paper feeder cassette or a manual feeding tray to the image forming unit 12.

The panel unit 17 includes a liquid-crystal display (LCD), and includes the display operation unit 171 and the physical operation unit 172.

The display operation unit 171 displays a variety of information. The display operation unit 171 includes a cathode ray tube (CRT) display, an LCD display, or an electroluminescent (EL) display, for example. The display operation unit 171 is a display device, such as a monitor or a line-display, which displays electronic data related to the process state of an operating system and a software application. The controller 10 displays the operation and state of the digital multifunction apparatus 1 via the display operation unit 171.

The display operation unit 171 includes a touch panel, and receives an instruction from a user.

The timer 18 measures and counts time. For example, the timer 18 acquires time from an internal clock or via the network 3.

The notification unit 19 causes an audio sound generator, such as a speaker, to generate a sound, such as a buzzer sound or a message. The notification unit 19 thus notifies nearby users of the warning or the message. The notification unit 19 may also transmit an alert mail to an external server via the network 3 or may contact a security firm. An administrator may register in advance a mail address serving as a destination of the alert mail and a contact address of the security firm.

The human-body detecting sensor 20 detects an intruder within a predetermined area. The human-body detecting sensor 20 may be a pyroelectric infrared sensor including a pyroelectric element that detects a change in infrared light created by the motion of an intruder. An intruder may also be detected by analyzing the image acquired by the imaging device, such as a camera. In such a case, a picture of a predetermined area is taken at predetermined time intervals, and the presence or absence of a change is detected between the images of multiple frames taken. If a change is noticed between images, intruder detection is performed based on the assumption that the intruder is found.

Referring to FIG. 2, a sector area AR represents an area where the human-body detecting sensor 20 detects an intruder. If a user enters the area AR, the human-body detecting sensor 20 detects the user. The human-body detecting sensor 20 provides an output if a target is present within the predetermined area (for example, a sector having a radius of 0 to 5 meters), and the output level varies depending on the distance to the target.

The configuration of digital multifunction apparatus 1 has been described above.

Intruder Detection Process of the First Embodiment of the Disclosure

Figure 5:
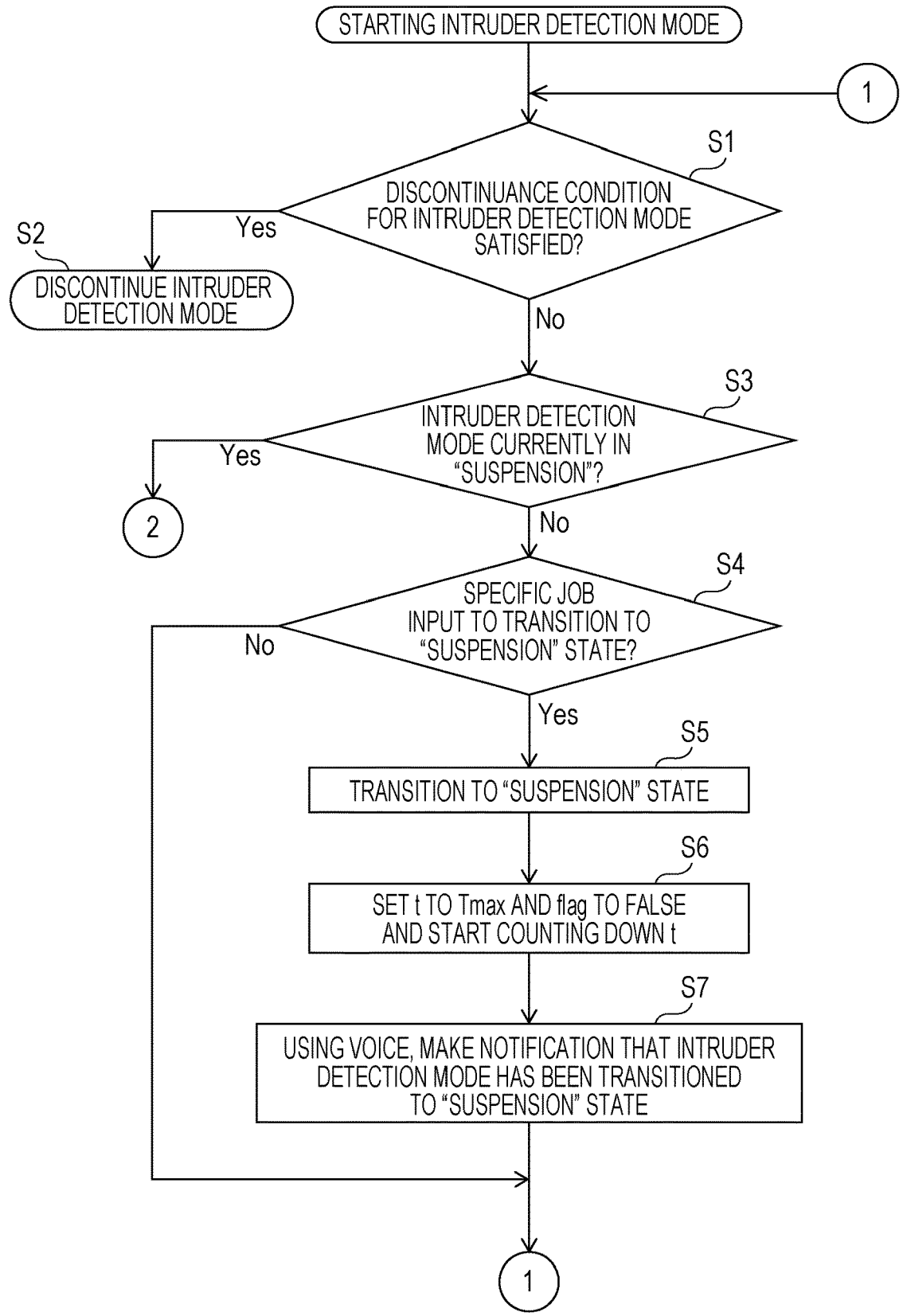
FIG. 5 is a flowchart illustrating an intruder detection process of the digital multifunction apparatus of FIG. 1.
Figure 6:
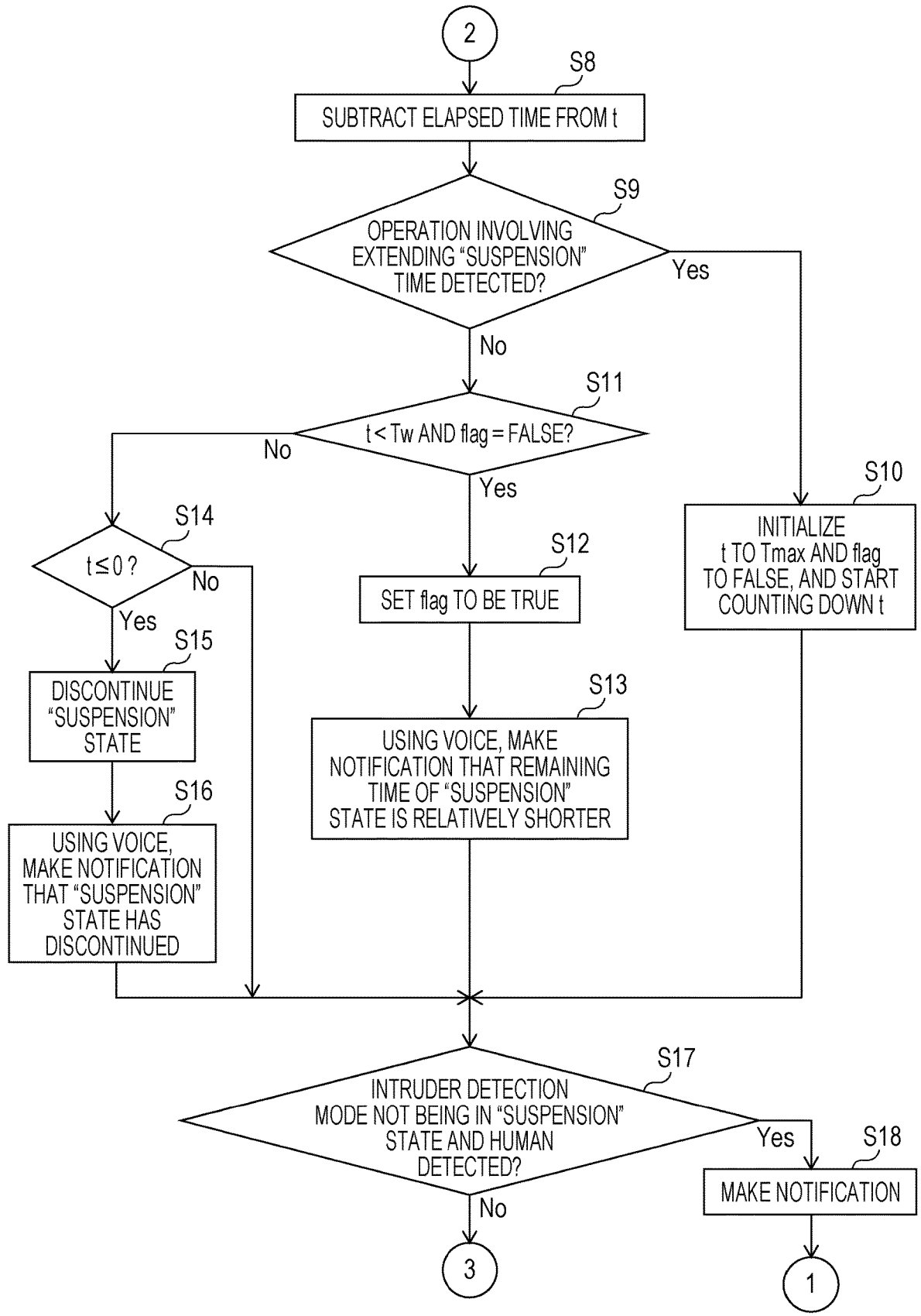
FIG. 6 is a flowchart illustrating the intruder detection process of the digital multifunction apparatus of FIG. 1.
Figure 7:
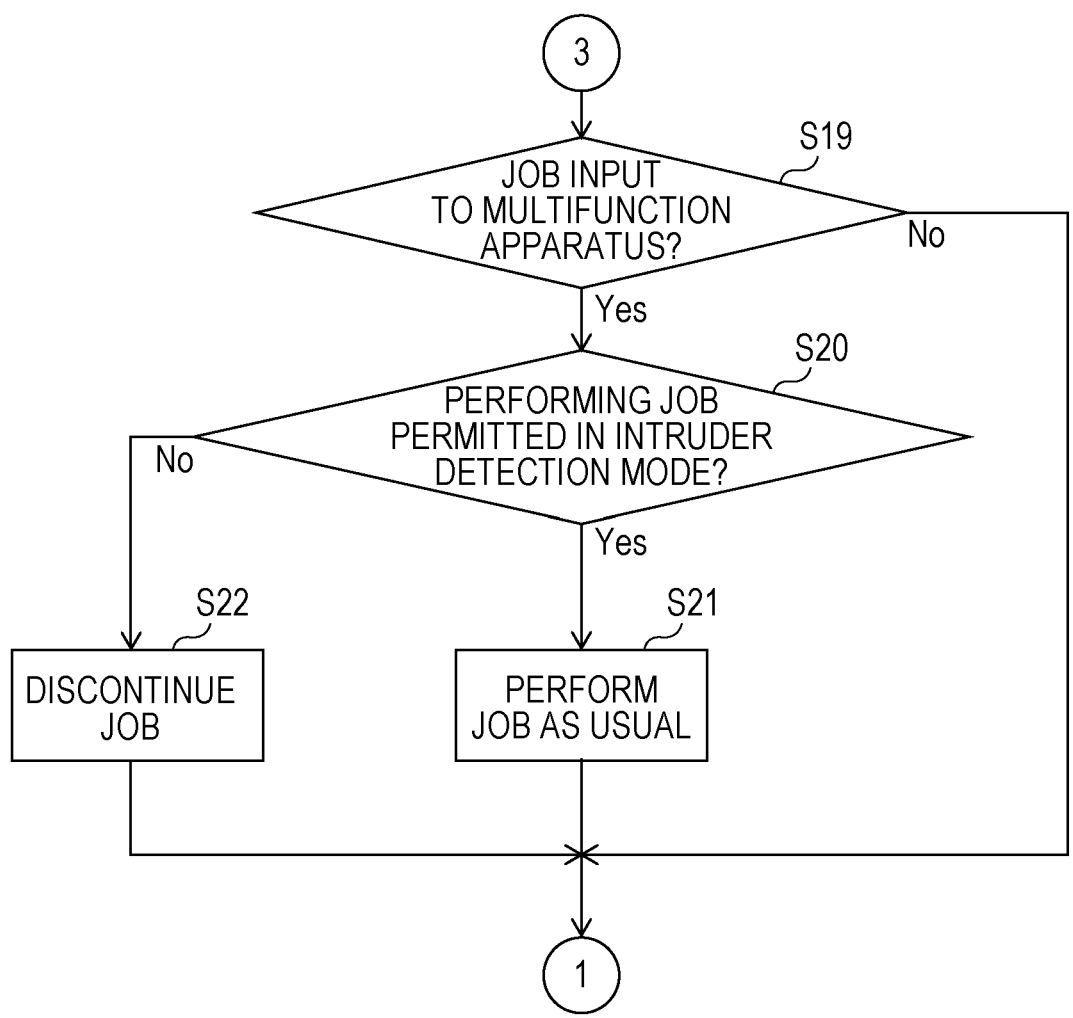
FIG. 7 is a flowchart illustrating the intruder detection process of the digital multifunction apparatus of FIG. 1.
Figure 8:
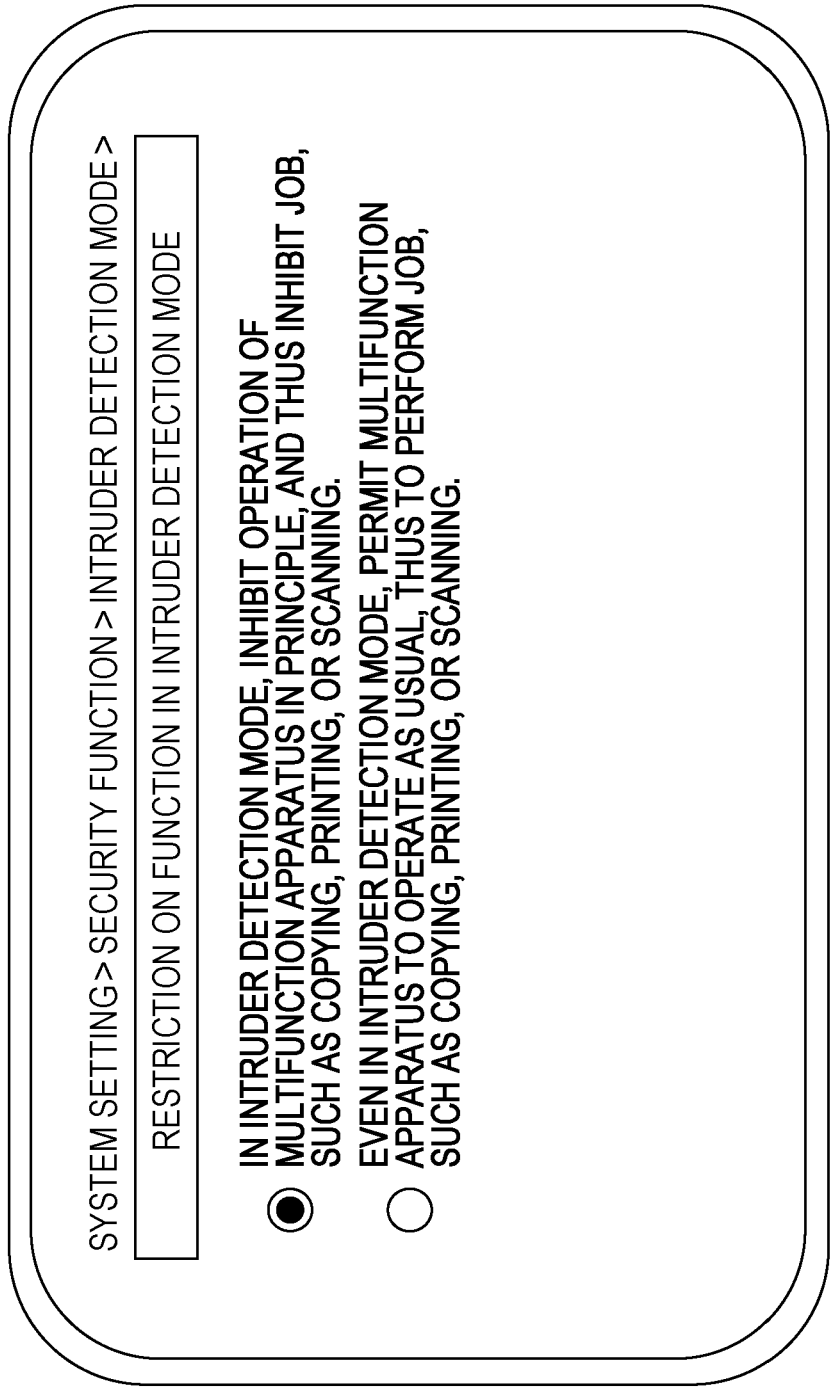
FIG. 8 illustrates an example of a function restriction setting screen in the intruder detection mode of the digital multifunction apparatus of FIG. 1.
Figure 9:
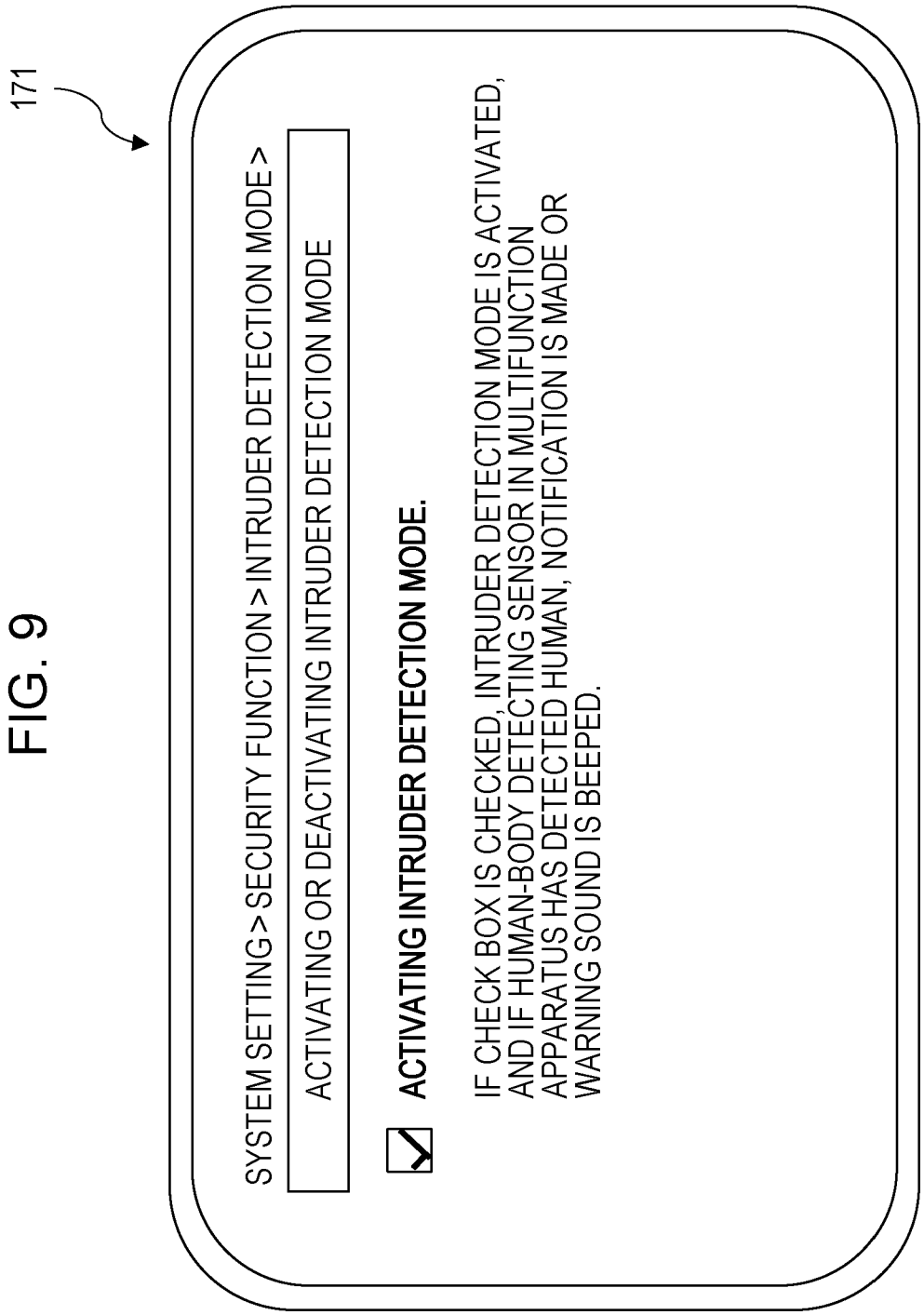
FIG. 9 illustrates an example of an activation and deactivation setting screen in the intruder detection mode of the digital multifunction apparatus of FIG. 1.
Figure 10:
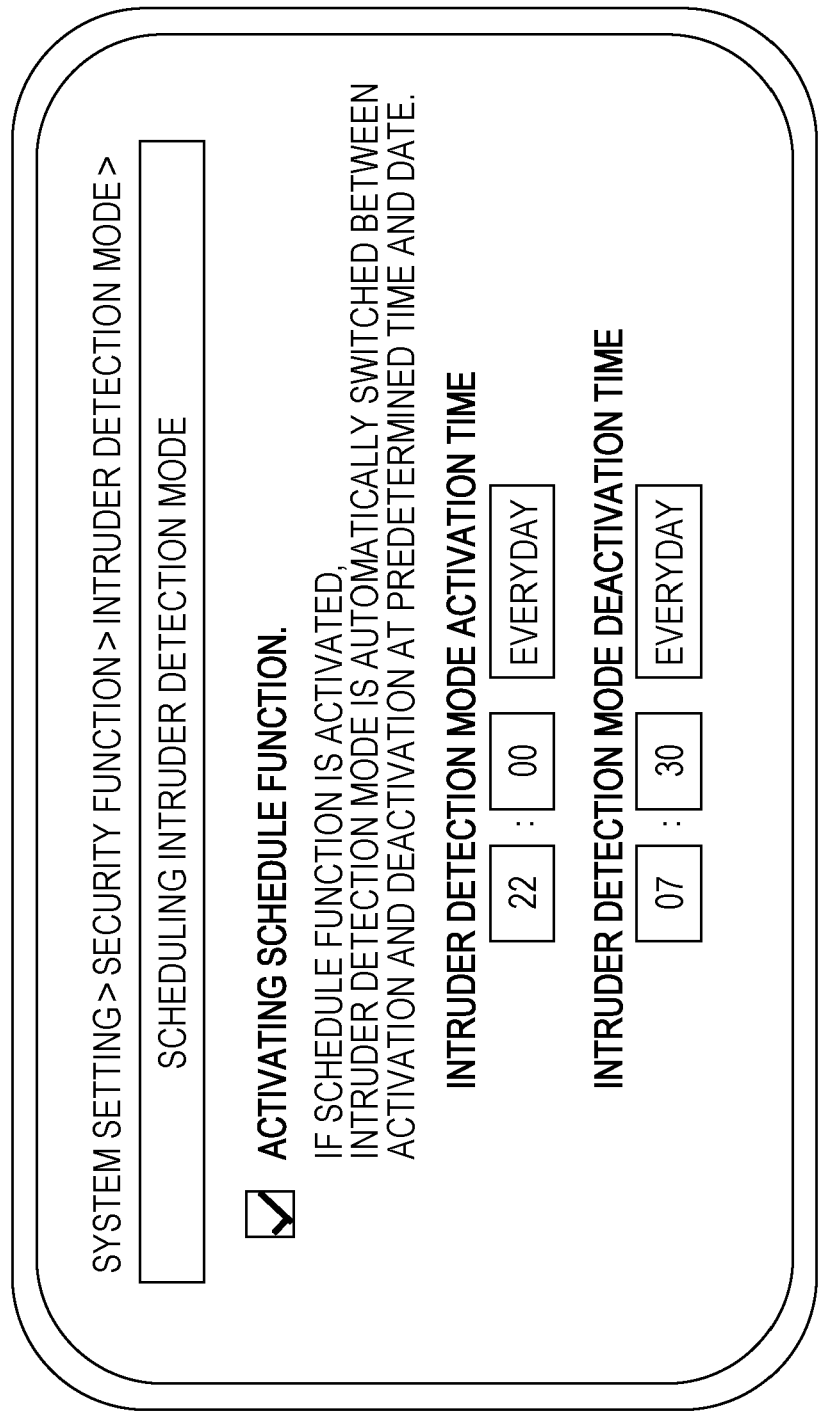
FIG. 10 illustrates an example of an intruder detection mode schedule setting screen of the image forming apparatus of FIG. 1.

An intruder detection process of the first embodiment of the disclosure is described in connection with FIGS. 5 through 11. FIGS. 5 through 7 are flowcharts illustrating the intruder detection process of the digital multifunction apparatus 1 of FIG. 1. FIG. 8 illustrates an example of a function restriction setting screen in the intruder detection mode of the digital multifunction apparatus 1 of FIG. 1. FIG. 9 illustrates an example of an activation and deactivation setting screen in the intruder detection mode of the digital multifunction apparatus 1 of FIG. 1. FIG. 10 illustrates an example of an intruder detection mode schedule setting screen of the digital multifunction apparatus 1 of FIG. 1.

In step S1 of FIG. 5, the controller 10 determines whether a predetermined discontinuance condition for the intruder detection mode is satisfied (step S1). For example, the discontinuance condition of the intruder detection mode may be a predetermined deactivation time of the intruder detection mode. The activation and deactivation of the intruder detection mode are described later in connection with FIGS. 10 and 11.

If the discontinuance condition of the intruder detection mode is satisfied (yes branch from step S1), the controller 10 discontinues the intruder detection mode in step S2 (step S2).

If the discontinuance condition of the intruder detection mode is not satisfied (no branch from step S1), the controller 10 determines in step S3 whether the intruder detection mode is in a suspension state (step S3).

If the intruder detection mode is in the suspension state (yes branch from step S3), the controller 10 performs an operation in step S8 of FIG. 6 (step S8 of FIG. 6).

If the intruder detection mode is not in the suspension state (no branch from step S3), the controller 10 performs an operation in step S4 (step S4).

In step S4, the controller 10 determines whether a predetermined specific job is input to set the intruder detection mode to the suspension state (step S4).

The predetermined specific job input to set the intruder detection mode to the suspension state may be determined to be input when fax data is received, when a print job performed by a personal computer (PC) is received, or when a startup of a remote scanning application on a PC is detected. If the specific job is performed, an authorized user is likely to move toward the front side of the digital multifunction apparatus 1 to retrieve a printed paper sheet (or to perform an operation to print data if the print data is not printed but temporarily stored on the memory 13) or to set an original document for scanning.

If the specific job is input in step S4 (yes branch from step S4), the controller 10 transitions the intruder detection mode to the suspension state (step S5).

In step S6, the controller 10 sets remaining time t of the suspension state to Tmax, and sets a determination flag to false. The determination flag is used to determine whether an indication that the remaining time of the suspension state is relatively shorter has already been notified or not. The controller 10 also causes the timer 18 to count down the remaining time t (step S6).

Tmax is any positive real number, and is an extension time given to an authorized user for him or her to retrieve the printed paper sheet or to set an original document to be scanned. In the first embodiment, Tmax ranges from 1 to 3 minutes.

In step S7, the controller 10 causes the notification unit 19 to notify to a user a voice message that the intruder detection mode is in the suspension state (step S7). The controller 10 repeats the determination operation in step S1 (step S1).

If the specific job is not input in step S4 (no branch from step S4), the controller 10 repeats the determination operation in step S1 (step S1).

In step S8 of FIG. 6, the controller 10 subtracts the elapsed time from the remaining time t of the suspension state (step S8).

In step S9, the controller 10 determines whether an operation involving extending suspension time is detected (step S9). The operation involving extending the suspension time may be detected when the print job is in progress, when the digital multifunction apparatus 1 is operated, or when the human-body detecting sensor 20 detects a person. A predetermined time period subsequent to the reception of the specific job or subsequent to the completion of the printing (several minutes, for example) may be set to be the extension time to the suspension time.

If the operation involving extending the suspension time is detected (yes branch from step S9), the controller 10 initializes the remaining time t of the suspension state to Tmax, and initializes to false the determination flag indicating whether an indication that the remaining time t is relatively shorter is notified (step S10). The controller 10 causes the timer 18 to down count the remaining time t (step S10). The controller 10 performs a determination operation in step S17 (step S17).

If the operation involving extending the suspension time is not detected (no branch from step S9), the controller 10 performs a determination operation in step S11 (step S11).

In step S11, the controller 10 determines whether the remaining time t of the suspension state is shorter than Tw and determines whether the determination flag is false (step S11). The determination flag indicates whether the indication that the remaining time t is relatively shorter is notified or not. Tw is a positive real number smaller than the initial value Tmax of the remaining time, and serves as a reference when a determination is made as to whether the user is to be notified that the remaining time t is relatively shorter.

If the remaining time t is shorter than Tw, and the determination flag is false (yes branch from step S11), the controller 10 sets the determination flag to be true (step S12).

In step S13, the controller 10 causes the notification unit 19 to notify a voice message telling that the remaining time of the suspension state is relatively shorter (step S13). The controller 10 then performs the determination operation in step S17 (step S17).

If it is determined in step S11 that the remaining time t is shorter than Tw, and that the determination flag is not false (no branch from step S11), the controller 10 determines in step S14 whether the remaining time t is equal to or below 0 (step S14).

If the remaining time t is equal to or below 0 (yes branch from step S14), the controller 10 discontinues the suspension state of the intruder detection mode in step S15 (step S15).

In step S16, the controller 10 causes the notification unit 19 to notify to the user the voice message telling that the suspension state has discontinued (step S16). The controller 10 performs the determination operation in step S17 (step S17).

If the remaining time t is longer than 0 (no branch from step S14), the controller 10 performs the determination operation in step S17 (step S17).

In step S17, the controller 10 determines whether the intruder detection mode is not in the suspension state and whether the human-body detecting sensor 20 has detected an intruder (step S17).

If it is determined that the intruder detection mode is not in the suspension state and that the human-body detecting sensor 20 has detected an intruder (yes branch from step S17), the controller 10 causes the notification unit 19 to make a notification in step S18 (step S18).

If it is determined in step S17 that the intruder detection mode is not in the suspension state and that the human-body detecting sensor 20 has not detected an intruder (no branch from step S17), the controller 10 performs a determination operation in step S19 of FIG. 7 (step S19).

In step S19 of FIG. 7, the controller 10 determines whether a job has been input to the digital multifunction apparatus 1 (step S19). If the job has been input to the digital multifunction apparatus 1 (yes branch from step S19), the controller 10 performs a determination operation in step S20 (step S20). If the job has not been input to the digital multifunction apparatus 1 (no branch from step S19), the controller 10 repeats the determination operation in step S1 (step S1).

In step S20, the controller 10 determines whether performing the job is permitted in the intruder detection mode (step S20).

Referring to FIG. 8, the user serving as the administrator may set a function restriction in the intruder detection mode of the digital multifunction apparatus 1 in advance.

If the radio button for the message reading "In intruder detection mode, inhibit operation of multifunction apparatus in principle, and thus inhibit performing job, such as copying, printing, or scanning" is selected, the functions of the digital multifunction apparatus 1 in the intruder detection mode are fully restricted.

On the other hand, if the radio button for the message reading "Even in intruder detection mode, permit multifunction apparatus to operate as usual, thus to perform job, such as copying, printing, or scanning" is selected, the functions of the digital multifunction apparatus 1 are fully permitted in the intruder detection mode.

Referring to FIG. 9, the user may set the intruder detection mode of the digital multifunction apparatus 1 to be activated or deactivated. If the check box for the message reading "Activating intruder detection mode" is checked, the intruder detection mode is activated.

Referring to FIG. 9, the display operation unit 171 may display the explaining message reading "If check box is checked, intruder detection mode is activated, and if human-body detecting sensor in multifunction apparatus has detected human, notification is made or warning sound is beeped".

Referring to FIG. 10, the user serving as the administrator may set the schedule of the intruder detection mode of the digital multifunction apparatus 1. If the check box for the message "Activating schedule function" is checked, the schedule function of the intruder detection mode is activated.

Referring to FIG. 10, intruder detection mode activation time is set to "22:00 everyday", and intruder detection mode deactivation time is set to be "07:30 everyday".

Referring to FIG. 10, the display operation unit 171 may display the explaining message reading "If schedule function is activated, intruder detection mode is automatically switched between activation and deactivation at predetermined time and data".

If it is determined in step S20 of FIG. 7 that performing the job in the intruder detection mode is permitted (yes branch from step S20), the controller 10 performs the job as usual in step S21 (step S21). The controller 10 then repeats the determination operation in step S1 (step S1).

If it is determined in step S20 of FIG. 7 that performing the job in the intruder detection mode is not permitted (no branch from step S20), the controller 10 discontinues the job in step S22 (step S22). The controller 10 then repeats the determination operation in step S1 (step S1).

If the specific job is input in the intruder detection mode, the intruder detection mode transitions to the suspension state. This sets the authorized user free from the inconvenience that in the intruder detection mode the authorized user becomes a target about which the notification or warning is made. The digital multifunction apparatus 1 more user-friendly than image forming apparatuses of the related art may thus result.

Second Embodiment

Figure 11:
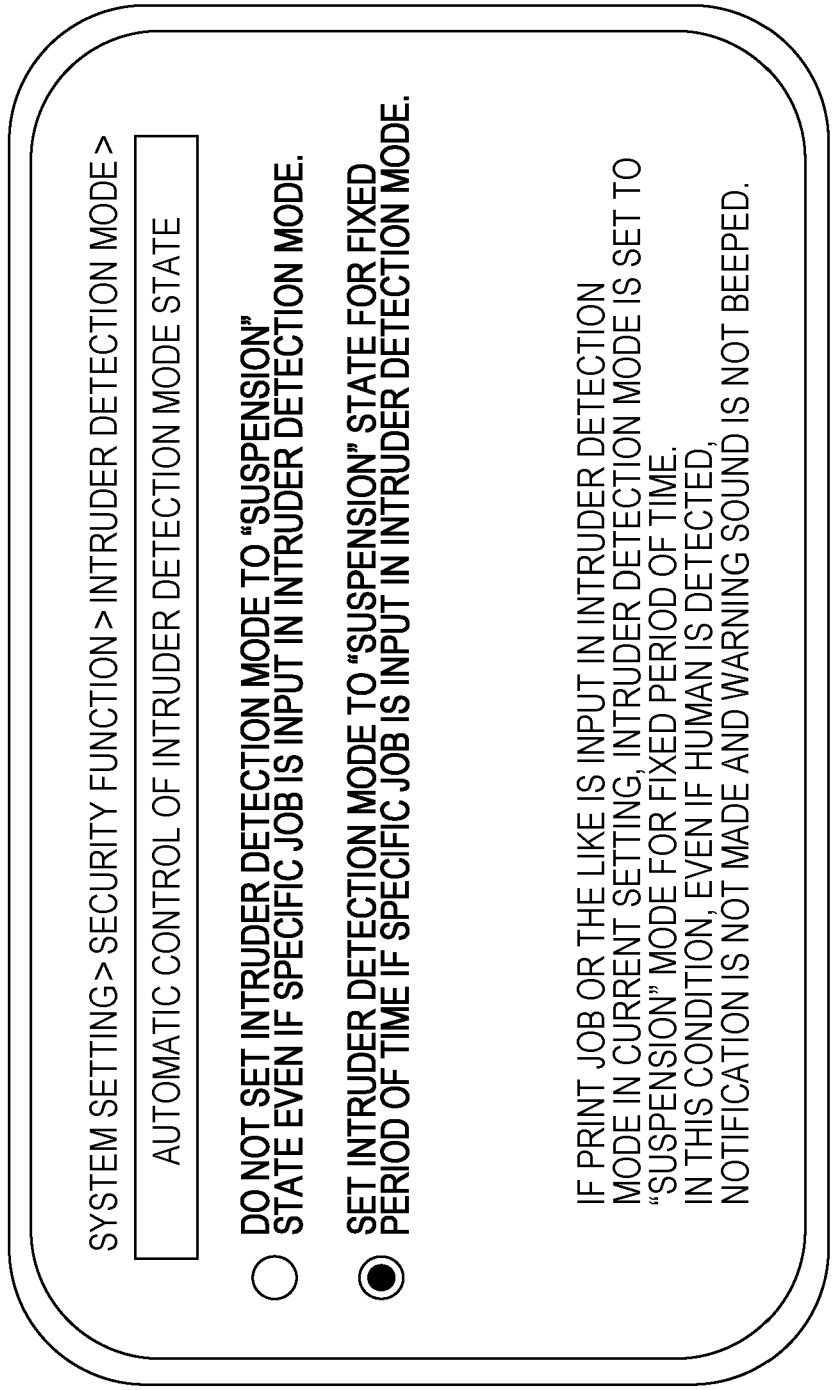
FIG. 11 illustrates an example of an automatic control setting screen in the intruder detection mode of a digital multifunction apparatus of a second embodiment of the disclosure.
Figure 12:
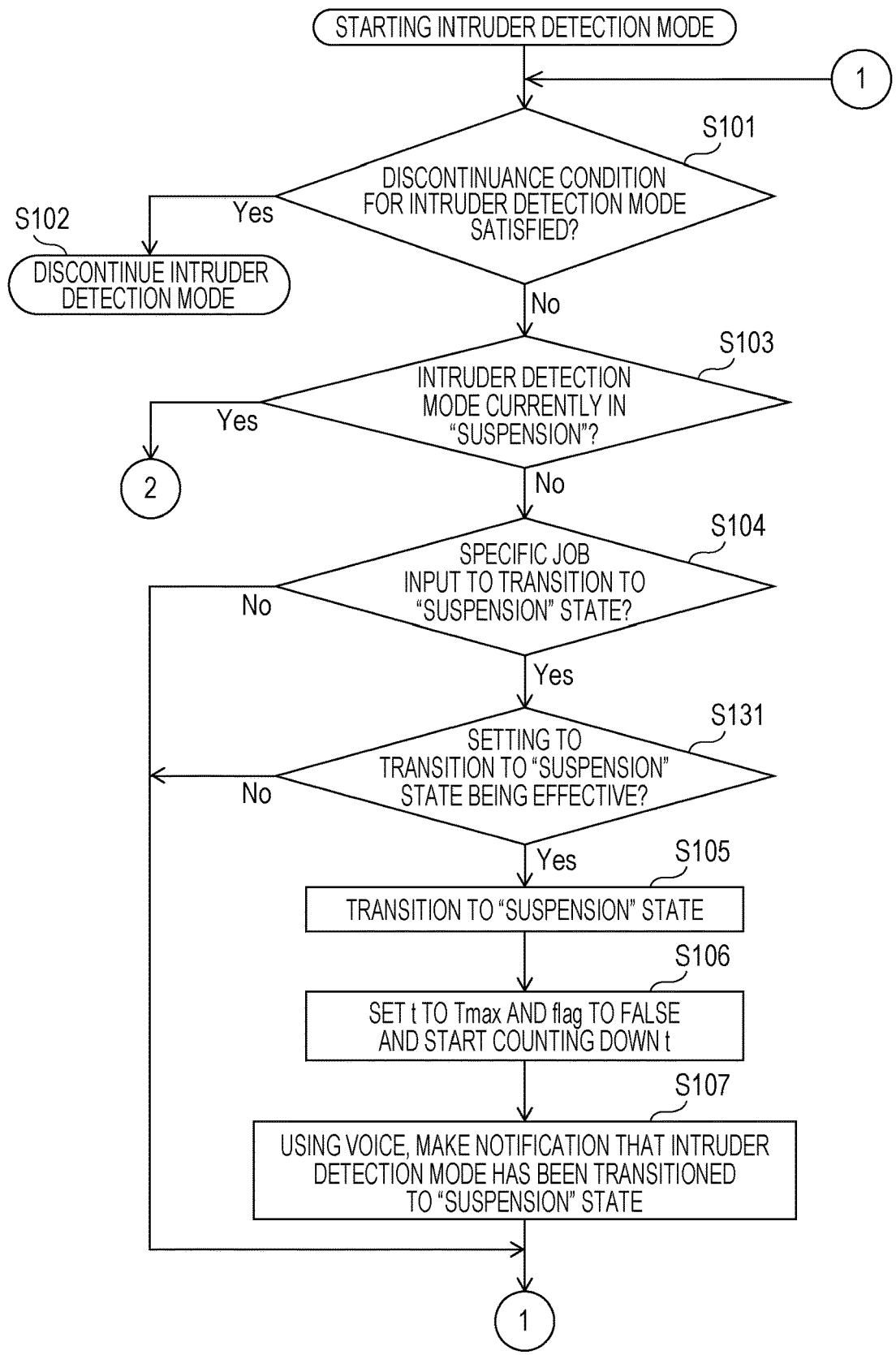
FIG. 12, corresponding to FIG. 5, illustrates the intruder detection process of the digital multifunction apparatus of the second embodiment of the disclosure.

Setting for automatic control in the intruder detection mode of a second embodiment of the disclosure is described in connection with FIGS. 11 and 12. FIG. 11 illustrates an example of an automatic control setting screen in the intruder detection mode of a digital multifunction apparatus 1 of the second embodiment of the disclosure. FIG. 12, corresponding to FIG. 5, illustrates the intruder detection process of the digital multifunction apparatus 1 of the second embodiment of the disclosure.

Steps S101 through S107 of FIG. 12 respectively correspond to steps S1 through S7 of FIG. 5, and the detailed discussion thereof is omitted herein. Step S131 not included in FIG. 5 is described below.

According to the first embodiment, the intruder detection mode is uniformly suspended if the specific job is input to the digital multifunction apparatus 1 in the intruder detection mode. According to the second embodiment, on the other hand, the automatic control is set in advance on the digital multifunction apparatus 1 during the intruder detection mode.

Specifically, referring to FIG. 11, the user serving as the administrator may select the radio button for the message reading "Do not set intruder detection mode to "suspension" state even if specific job is input in intruder detection mode" or the radio button for the message reading "Set intruder detection mode to "suspension" state if predetermined job is input in intruder detection mode".

The display operation unit 171 may display the message reading "If print job or the like is input in intruder detection mode in current setting, intruder detection mode is set to "suspension" mode for fixed period of time. In this condition, even if human is detected, notification is not made and warning sound is not beeped".

If the specific job is input to transition to the "suspension" state in step S104 of FIG. 12 (yes branch from step S104), the controller 10 determines in step S131 whether the setting to transition the intruder detection mode to the "suspension" state is effective (step S131).

If the setting to transition the intruder detection mode to the "suspension" state is effective (yes branch from step S131), the controller 10 transition the intruder detection mode to the suspension state in step S105 (step S105).

If the setting to transition the intruder detection mode to the "suspension" state is not effective (no branch from step S131), the controller 10 repeats the determination operation in step S101 (step S101).

The setting to transition the intruder detection mode to the "suspension" state is configurable to be effective when the specific job is input in the intruder detection mode. This may set the authorized user free from becoming a target about which a notification is made or a warning is issued in the intruder detection mode, and may reduce the vulnerability to theft of secret documents by an intruder. The digital multifunction apparatus 1 more user-friendly than image forming apparatuses of the related art may thus result.

Third Embodiment

Figure 13:
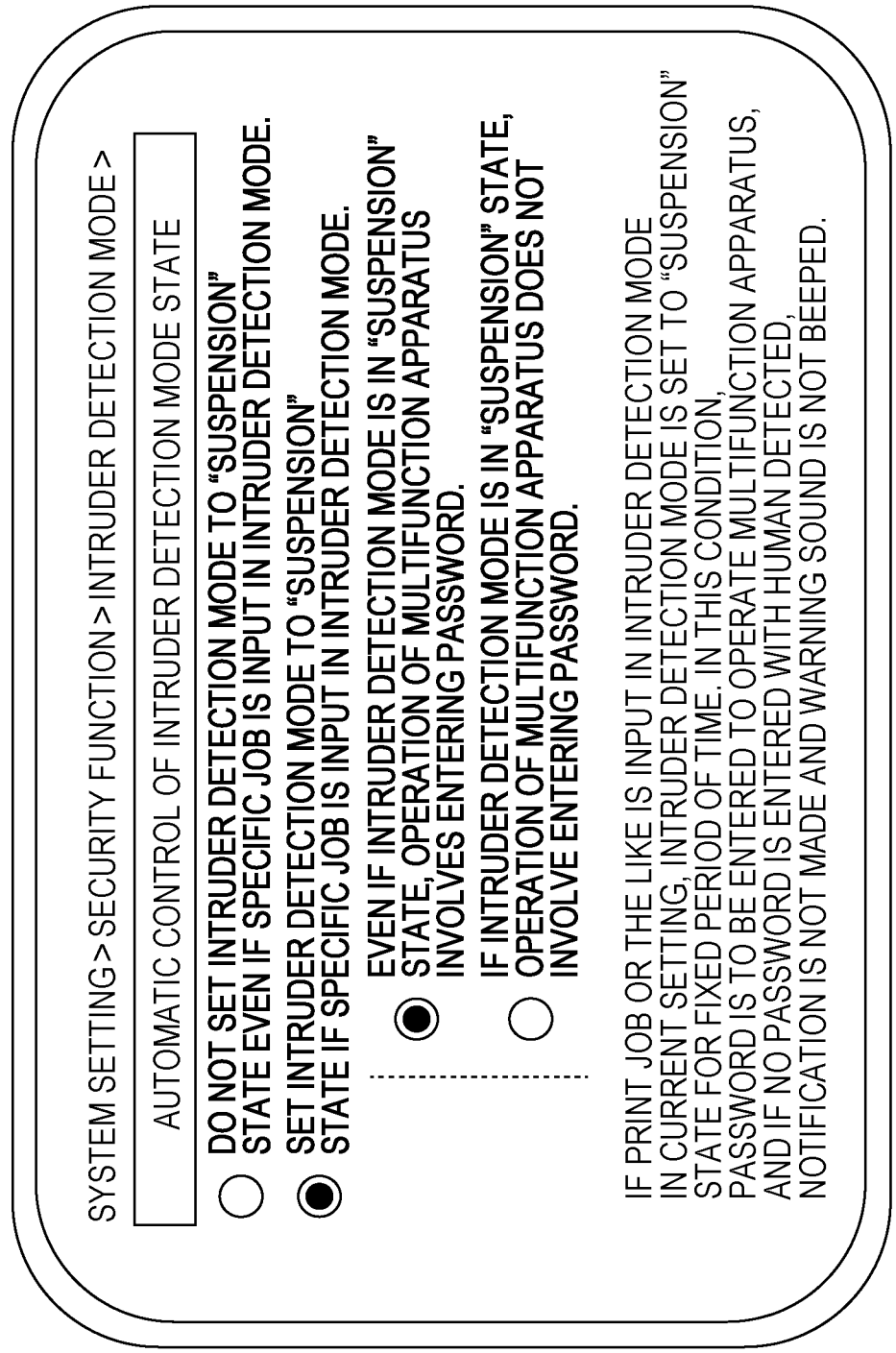
FIG. 13 illustrates an example of an automatic control setting screen in the intruder detection mode of a digital multifunction apparatus of a third embodiment of the disclosure.
Figure 14:
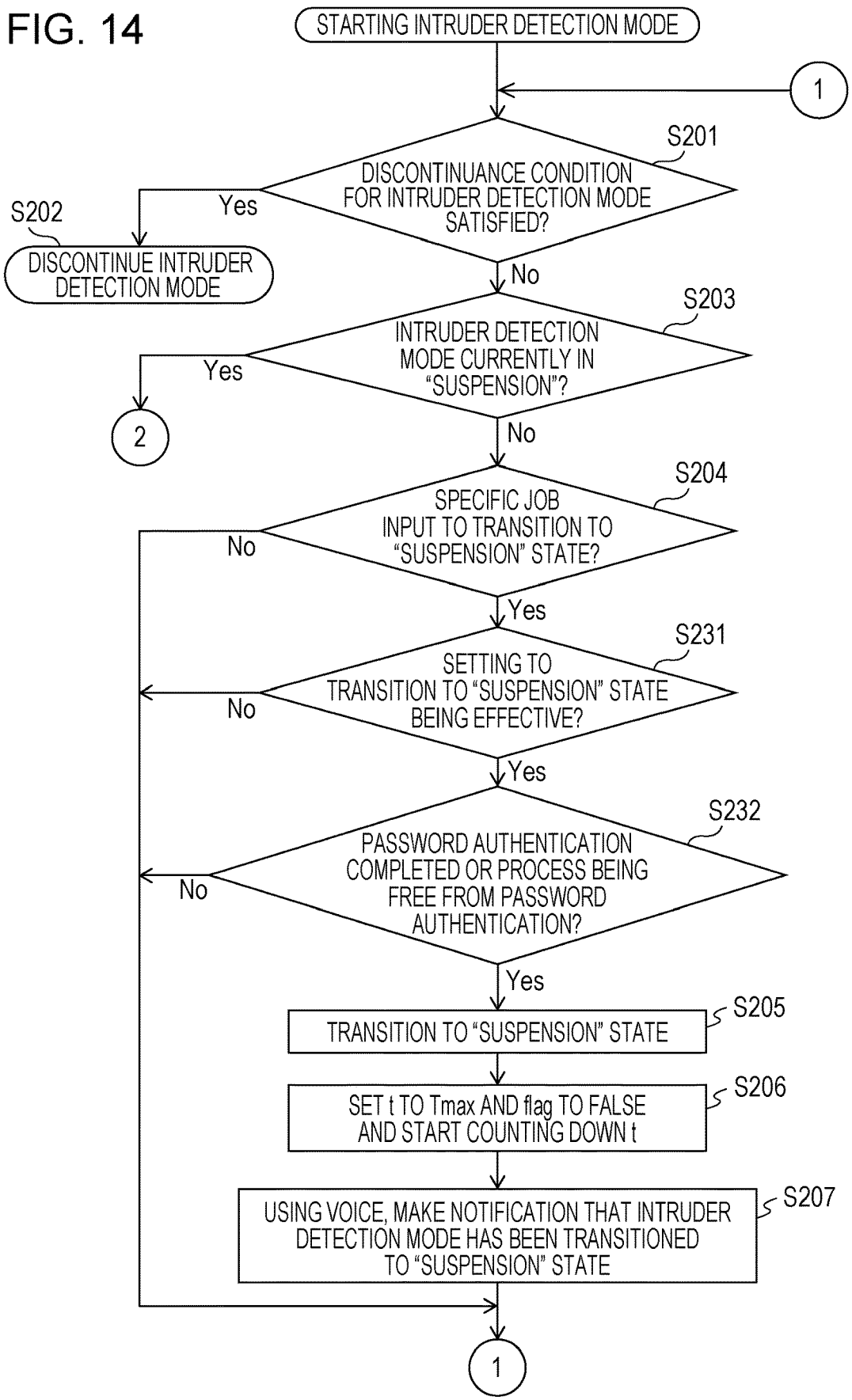
FIG. 14, corresponding to FIG. 5, illustrates the intruder detection process of the digital multifunction apparatus of the third embodiment of the disclosure.

The automatic control setting in the intruder detection mode of a third embodiment is described in connection with FIGS. 13 and 14. FIG. 13 illustrates an example of the automatic control setting screen in the intruder detection mode of a digital multifunction apparatus 1 of the third embodiment of the disclosure. FIG. 14, corresponding to FIG. 5, illustrates the intruder detection process of the digital multifunction apparatus 1 of the third embodiment of the disclosure.

Steps S201 through S207, and S231 of FIG. 14 respectively correspond to steps S101 through S107 and S131 of FIG. 12, and the detailed discussion thereof is omitted herein. A determination operation in step S232 not illustrated in FIG. 12 is described below.

According to the second embodiment, if the radio button for the message reading "Set intruder detection mode to "suspension" state even if specific job is input in intruder detection mode" is selected, and the specific job is input to the digital multifunction apparatus 1 in the intruder detection mode, the intruder detection mode is uniformly set to the suspension state.

According to the third embodiment, even if the radio button for the message reading "Set intruder detection mode to "suspension" state even if specific job is input in intruder detection mode" is selected, whether to proceed to password authentication is set to be configurable.

Specifically, referring to FIG. 13, the radio button for the message reading "Set intruder detection mode to "suspension" state if specific job is input in intruder detection mode" is selected. In this case, the user serving as the administrator still selects the radio button for the message reading "Even if intruder detection mode is in "suspension" state, operation of multifunction apparatus involves entering password" or the radio button for the message reading "If intruder detection mode is in "suspension" state, operation of multifunction apparatus does not involve entering password".

The display operation unit 171 may display the explaining message reading "If print job or the like is input in intruder detection mode in current setting, intruder detection mode is set to "suspension" state for fixed period of time. In this condition, password is to be entered to operate multifunction apparatus, and if no password is entered with human detected, notification is not made and warning sound is not beeped".

If the setting to transition the intruder detection mode to the "suspension" state is not effective when the specific job is input to transition to the suspension state as illustrated in FIG. 14 (yes branch from step S231), the controller 10 determines in step S232 whether password authentication has been completed or the process is free from password authentication (step S232).

If the password authentication has been completed or the process is free from password authentication (yes branch from step S232), the controller 10 transitions the intruder detection mode to the suspension state in step S205 (step S205).

If the password authentication is not successful (no branch from step S232), the controller 10 repeats the determination operation in step S201 (step S201).

After the suspension state of the intruder detection mode, an authentication password is to be input to operate the digital multifunction apparatus 1. This may set the authorized user free from becoming a target about which a notification is made or a warning is issued in the intruder detection mode, and may reduce the vulnerability to theft of secret documents by an intruder. The digital multifunction apparatus 1 more user-friendly than image forming apparatuses of the related art may thus result.

Fourth Embodiment

Figure 15:
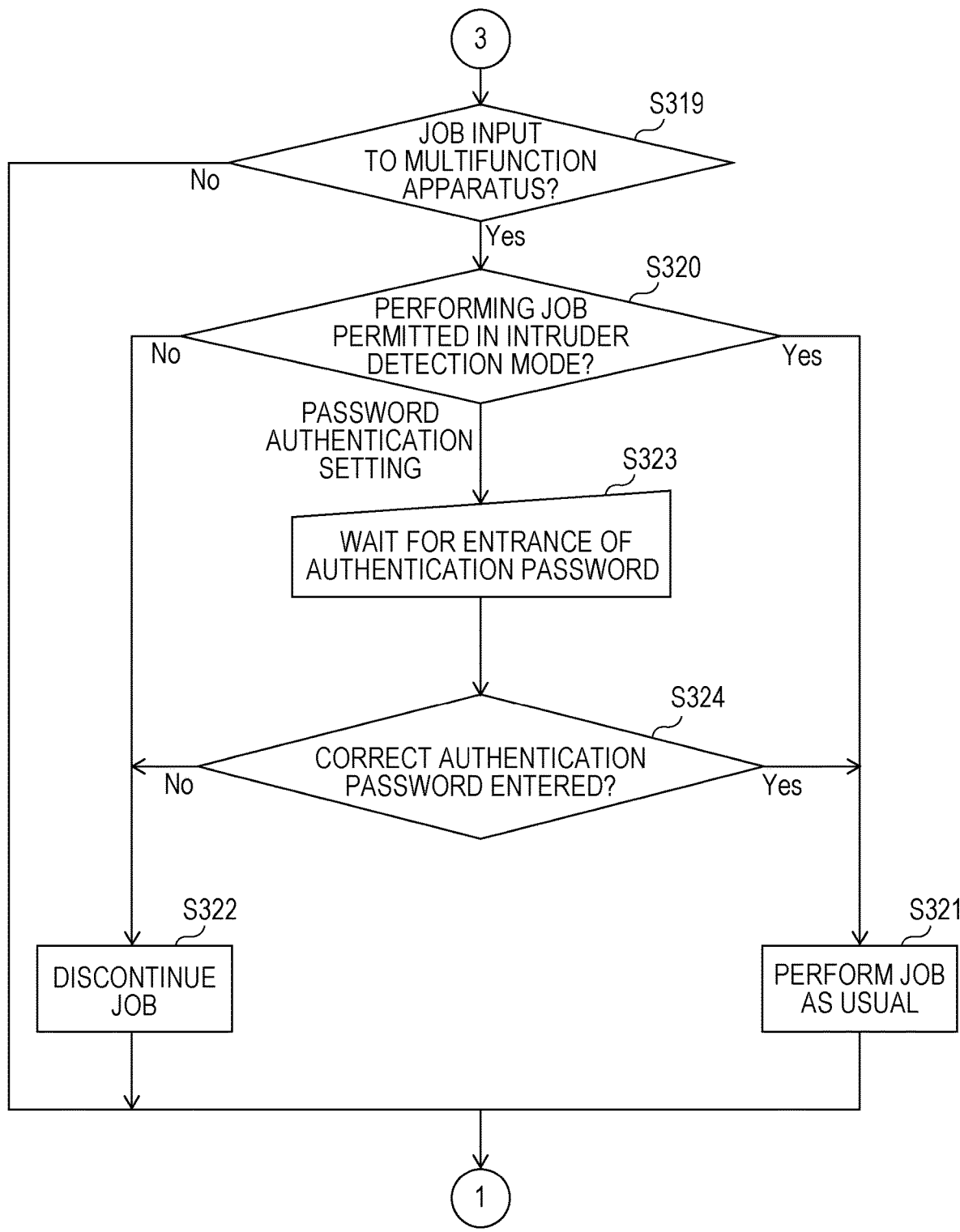
FIG. 15, corresponding to FIG. 7, illustrates the intruder detection process of a digital multifunction apparatus of a fourth embodiment of the disclosure.

The automatic control setting in the intruder detection mode of a fourth embodiment of the disclosure is described in connection with FIG. 15. FIG. 15, corresponding to FIG. 7, illustrates the intruder detection process of a digital multifunction apparatus 1 of the fourth embodiment of the disclosure.

Steps S319 through S322 of FIG. 15 respectively correspond to steps S19 through S22 of FIG. 7, and the detailed discussion thereof is omitted herein. Operations in steps S323 and S324 not illustrated in FIG. 7 are described below. The process related to FIGS. 5 and 6 remains unchanged from the one discussed in connection with FIGS. 5 and 6, and the discussion thereof is omitted herein.

According to the first embodiment, the controller 10 determines whether to perform or discontinue the job, based on the determination of whether performing the job is permitted in the intruder detection mode. According to the fourth embodiment, the password authentication setting is additionally performed when the job is performed in the intruder detection mode.

If the authentication setting of the password is effective in step S320 of FIG. 15, the controller 10 waits on standby for the inputting of the authentication password in step S323 (step S323).

Figure 16:
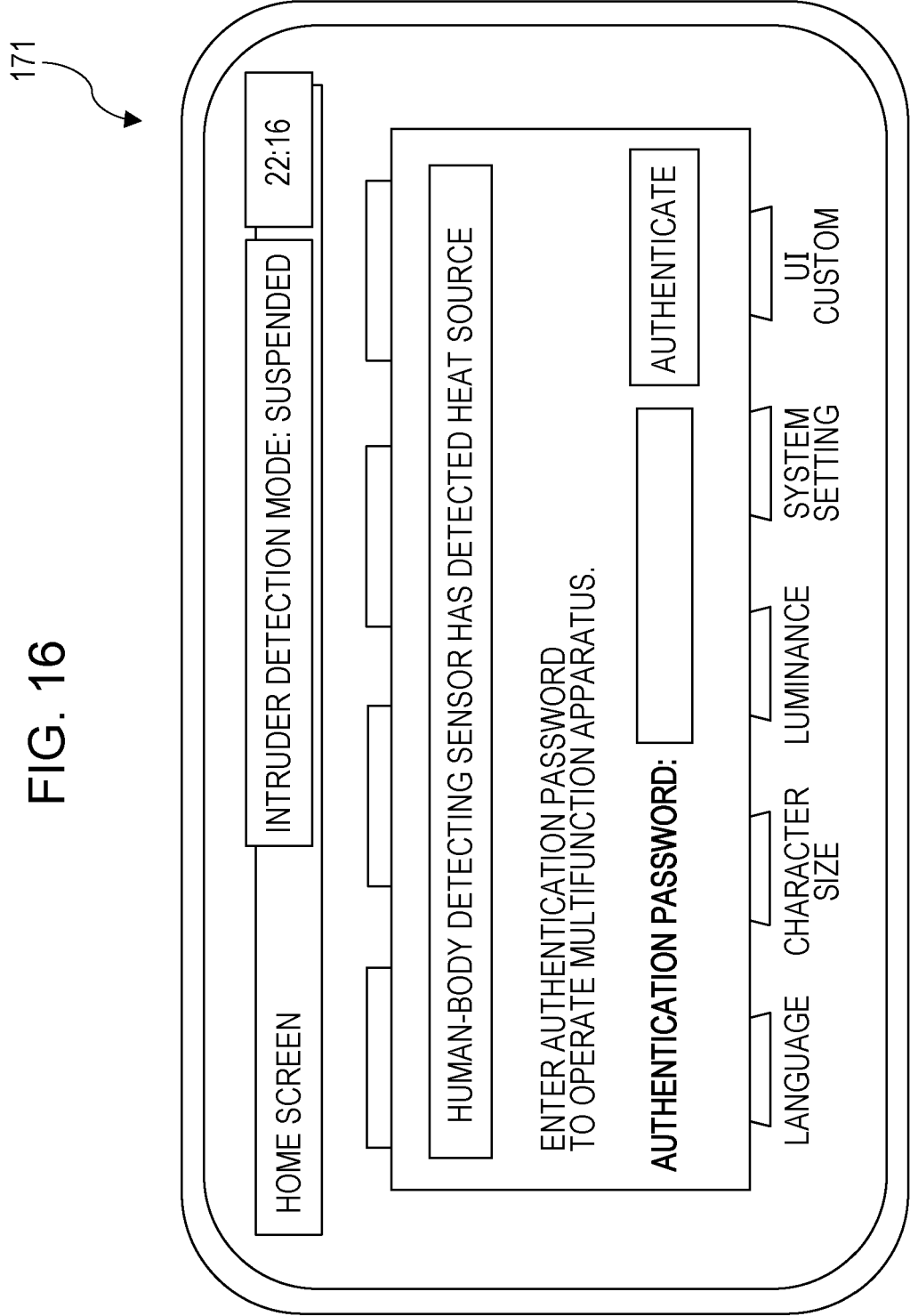
FIG. 16 illustrates an example of a display screen when a human-body detecting sensor detects a heat source in the intruder detection mode of the digital multifunction apparatus of the fourth embodiment of the disclosure.

Referring to FIG. 16, the display operation unit 171 displays an input box for the authentication password and an authentication icon together with the message reading "Enter authentication password to operate multifunction apparatus", and thus prompts the user to enter the authentication password.

When the authentication password is entered, the controller 10 determines in step S324 whether the correct authentication password has been entered (step S324). If the correct authentication password has been entered (yes branch from step S324), the controller 10 performs an operation in step S321 (step S321). If the correct authentication password has not been entered (no branch from step S324), the controller 10 performs an operation in step S322 (step S322).

The controller 10 may perform a process predetermined depending on the type of the specific job. For example, the controller 10 performs the job without performing the password authentication if the intruder detection mode is in the suspension state or performs the password authentication prior to performing the job even in the suspension state.

After the suspension state of the intruder detection mode, the authentication password is to be input to operate the digital multifunction apparatus 1. This may set the authorized user free from becoming a target about which a notification is made or a warning is issued in the intruder detection mode, and may reduce the vulnerability to theft of secret documents by an intruder. The digital multifunction apparatus 1 more user-friendly than image forming apparatuses of the related art may thus result.

Fifth Embodiment

Figure 17:
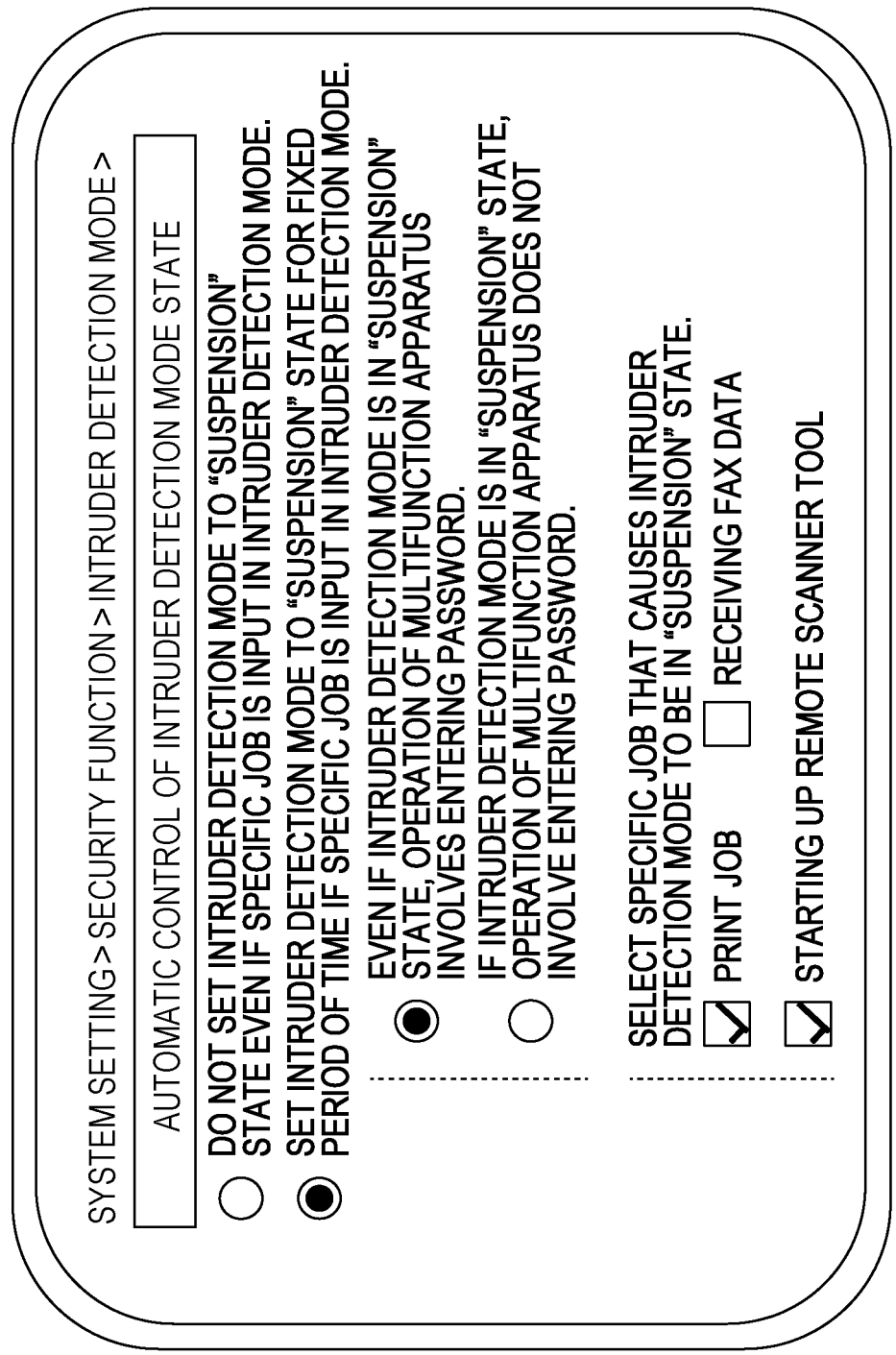
FIG. 17 illustrates an example of an automatic control setting screen in the intruder detection mode of a digital multifunction apparatus of a fifth embodiment of the disclosure.

The automatic control setting in the intruder detection mode of a fifth embodiment of the disclosure is described in connection with FIG. 17. FIG. 17 illustrates the automatic control setting screen in the intruder detection mode of a digital multifunction apparatus 1 of the fifth embodiment of the disclosure.

According to the fifth embodiment, the type of the specific job is set to transition to the suspension state of the intruder detection mode as illustrated in FIG. 17.

Referring to FIG. 17, three types of jobs "print job", "receiving fax data", and "starting up remote scanner tool" are listed, and the check boxes for "print job", and "starting up remote scanner tool" are checked.

In this case, if the two types of jobs "print job" and "receiving fax data" are input in the intruder detection mode, the controller 10 transitions the intruder detection mode to the suspension state. On the other hand, even if the job "starting up remote scanner tool" is input in the intruder detection mode, the controller 10 does not suspend the intruder detection mode.

If the specific job set by the user is input in the intruder detection mode, the intruder detection mode is suspended in this way. This may set the authorized user free from becoming a target about which a notification is made or a warning is issued in the intruder detection mode. The digital multifunction apparatus 1 more user-friendly than image forming apparatuses of the related art may thus result.

Sixth Embodiment

Figure 18:
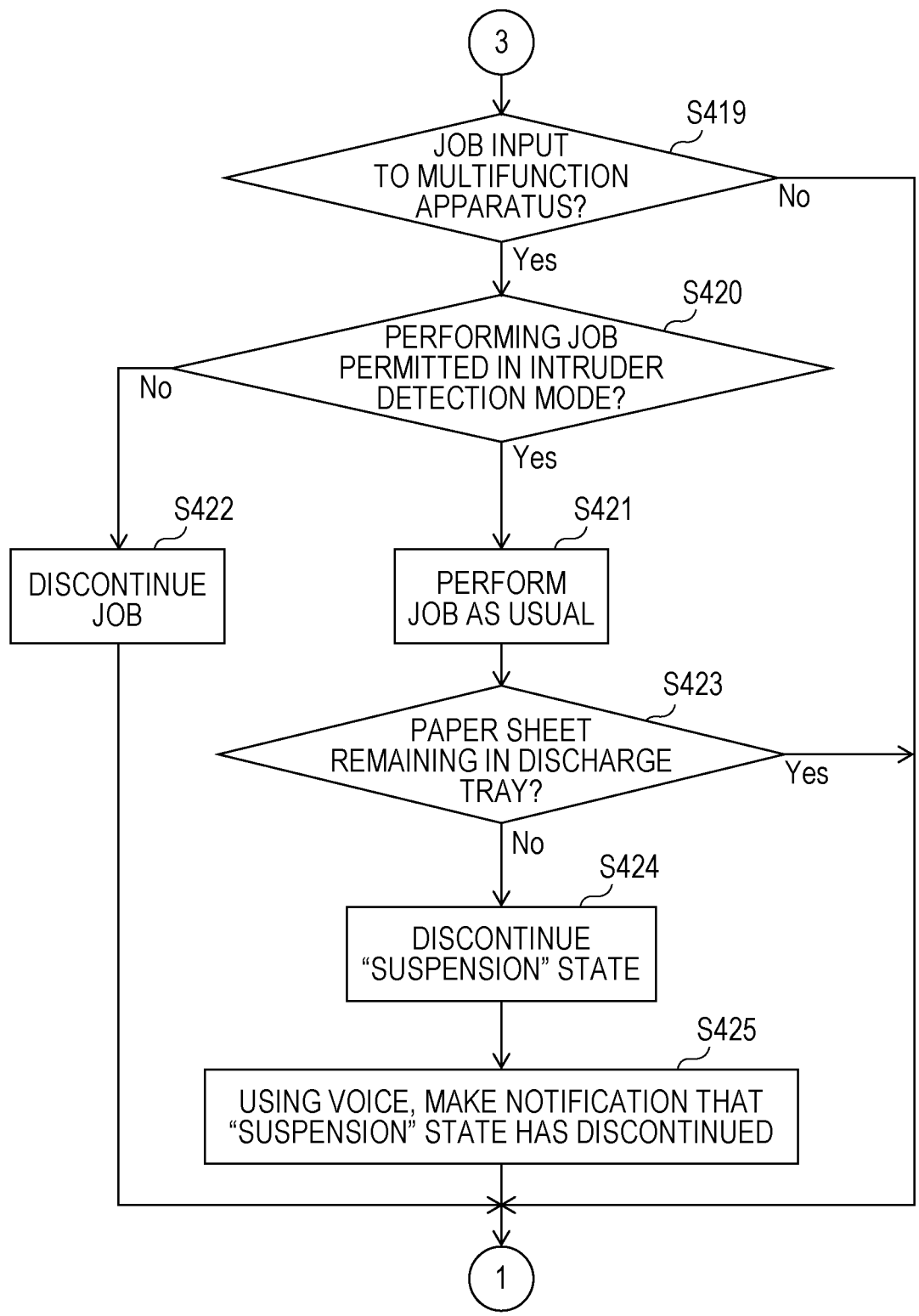
FIG. 18, corresponding to FIG. 7, illustrates the intruder detection process of a digital multifunction apparatus of a sixth embodiment of the disclosure.

The automatic control setting in the intruder detection mode of a sixth embodiment of the disclosure is described in connection with FIG. 18. FIG. 18, corresponding to FIG. 7, illustrates the intruder detection process of a digital multifunction apparatus 1 of the sixth embodiment of the disclosure.

Steps S419 through S422 of FIG. 18 respectively correspond to steps S19 through S22 of FIG. 7, and the detailed discussion thereof is omitted herein. Operations in steps S423 through S425 not illustrated in FIG. 7 are described below. The process related to FIGS. 5 and 6 remains unchanged from the one discussed in connection with FIGS. 5 and 6, and the discussion thereof is omitted herein.

According to the sixth embodiment, the digital multifunction apparatus 1 further includes a paper sheet sensor that detects the presence or absence of a paper sheet in a discharge tray into which printed paper sheets are discharged.

When the specific job has been performed in step S421 of FIG. 18 after the suspension state of the intruder detection mode (step S421), the controller 10 causes the paper sheet sensor to detect the presence of a paper sheet in the discharge tray, and thus determines whether a paper sheet is present in the discharge tray in step S423 (step S423).

If there is a paper sheet in the discharge tray (yes branch from step S423), the controller 10 repeats the determination operation in step S1 (step S1).

If there is no paper sheet in the discharge tray (no branch from step S423), the controller 10 discontinues the suspension state of the intruder detection mode in step S424 (step S424).

In step S425, the controller 10 causes the notification unit 19 to output a voice message notifying that the suspension state has discontinued (step S425). The controller 10 then repeats the determination operation in step S1 (step S1).

If the paper sheet sensor no longer detects any paper sheet discharged into the discharge tray, the controller 10 may discontinue the suspension state of the intruder detection mode.

The suspension state of the intruder detection mode is discontinued if a paper sheet discharged into the discharge tray is retrieved after the print data related to the print job is printed. The digital multifunction apparatus 1 more user-friendly than image forming apparatuses of the related art may thus result.

Seventh Embodiment

Figure 19:
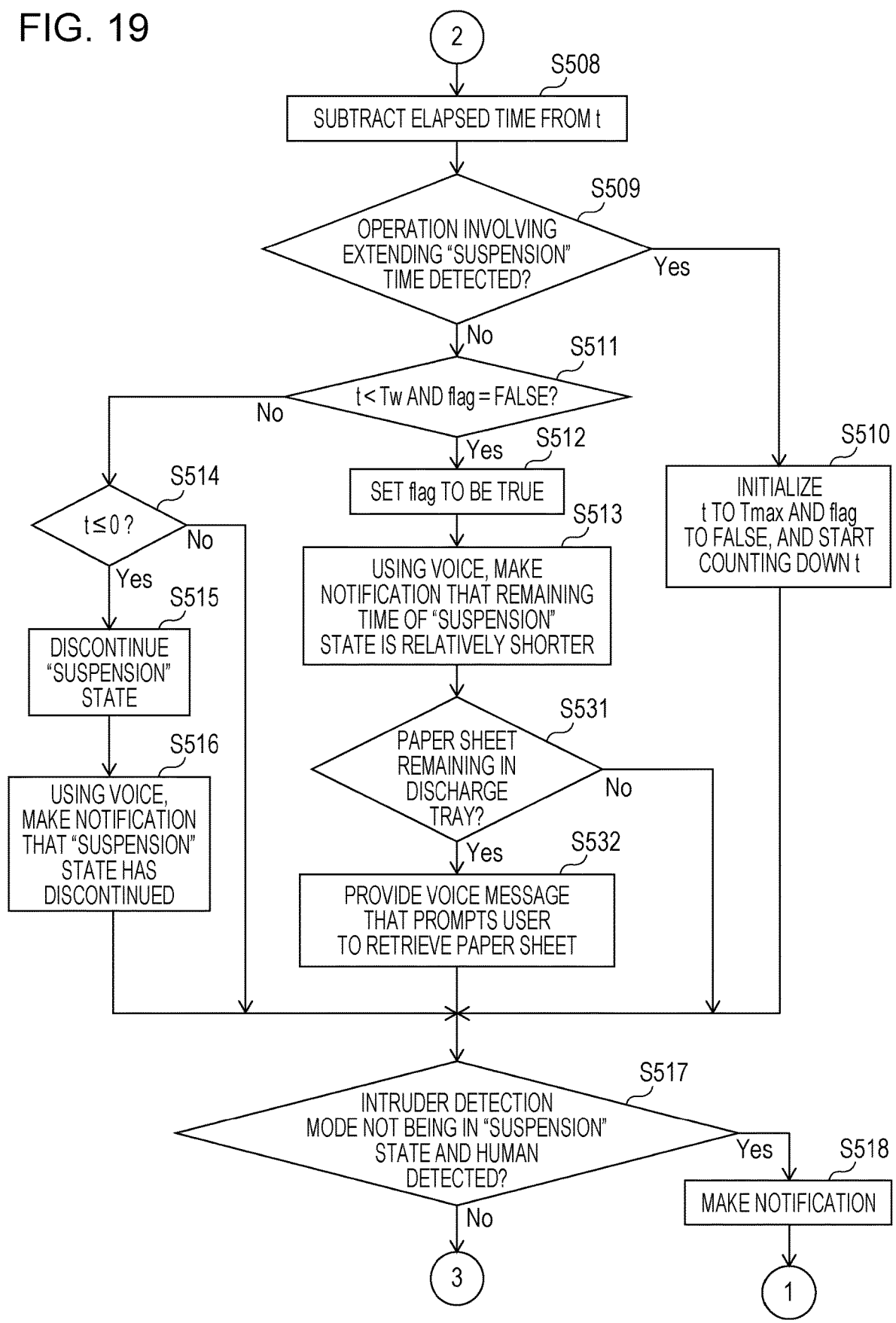
FIG. 19, corresponding to FIG. 6, illustrates the intruder detection process of a digital multifunction apparatus of a seventh embodiment of the disclosure.

The automatic control setting in the intruder detection mode of a seventh embodiment of the disclosure is described in connection with FIG. 19. FIG. 19, corresponding to FIG. 6, illustrates the intruder detection process of a digital multifunction apparatus 1 of the sixth embodiment of the disclosure.

Steps S508 through S518 of FIG. 19 respectively correspond to steps S8 through S18 of FIG. 6, and the detailed discussion thereof is omitted herein. Operations in steps S531 and S532 not illustrated in FIG. 6 are described below. The process related to FIGS. 5 and 7 remains unchanged from the one discussed in connection with FIGS. 5 and 7, and the discussion thereof is omitted herein.

According to the seventh embodiment, the digital multifunction apparatus 1 further includes the paper sheet sensor that detects the presence or absence of a printed paper sheet discharged into the discharge tray.

When the controller 10 causes the notification unit 19 to make with a voice message a notification that the remaining time for the suspension state is relatively shorter in step S513 of FIG. 19 (step S513), the controller 10 causes the paper sheet sensor to detect the presence or absence of a paper sheet in the discharge tray and thus determines whether the paper sheet is present in the discharge tray in step S531 (step S531).

If there is a paper sheet in the discharge tray (yes branch from step S531), the controller 10 causes the notification unit 19 to make a notification with the voice message prompting the user to retrieve the paper sheet (step S532). If there is no paper sheet in the discharge tray (no branch from step S531), the controller 10 performs a determination operation in step S517 (step S517).

If the paper sheet sensor has detected the paper sheet in the discharge tray a predetermined time period before the suspension state of the intruder detection mode finishes, the controller 10 causes the notification unit 19 to make a notification with the voice message prompting the user to retrieve the paper sheet.

The notification is made using the voice message prompting the user to retrieve the paper sheet the predetermined time period before the suspension state of the intruder detection mode finishes. This may set the authorized user free from becoming a target about which a notification is made or a warning is issued in the intruder detection mode. The digital multifunction apparatus 1 more user-friendly than image forming apparatuses of the related art may thus result.

Eighth Embodiment

Figure 20:
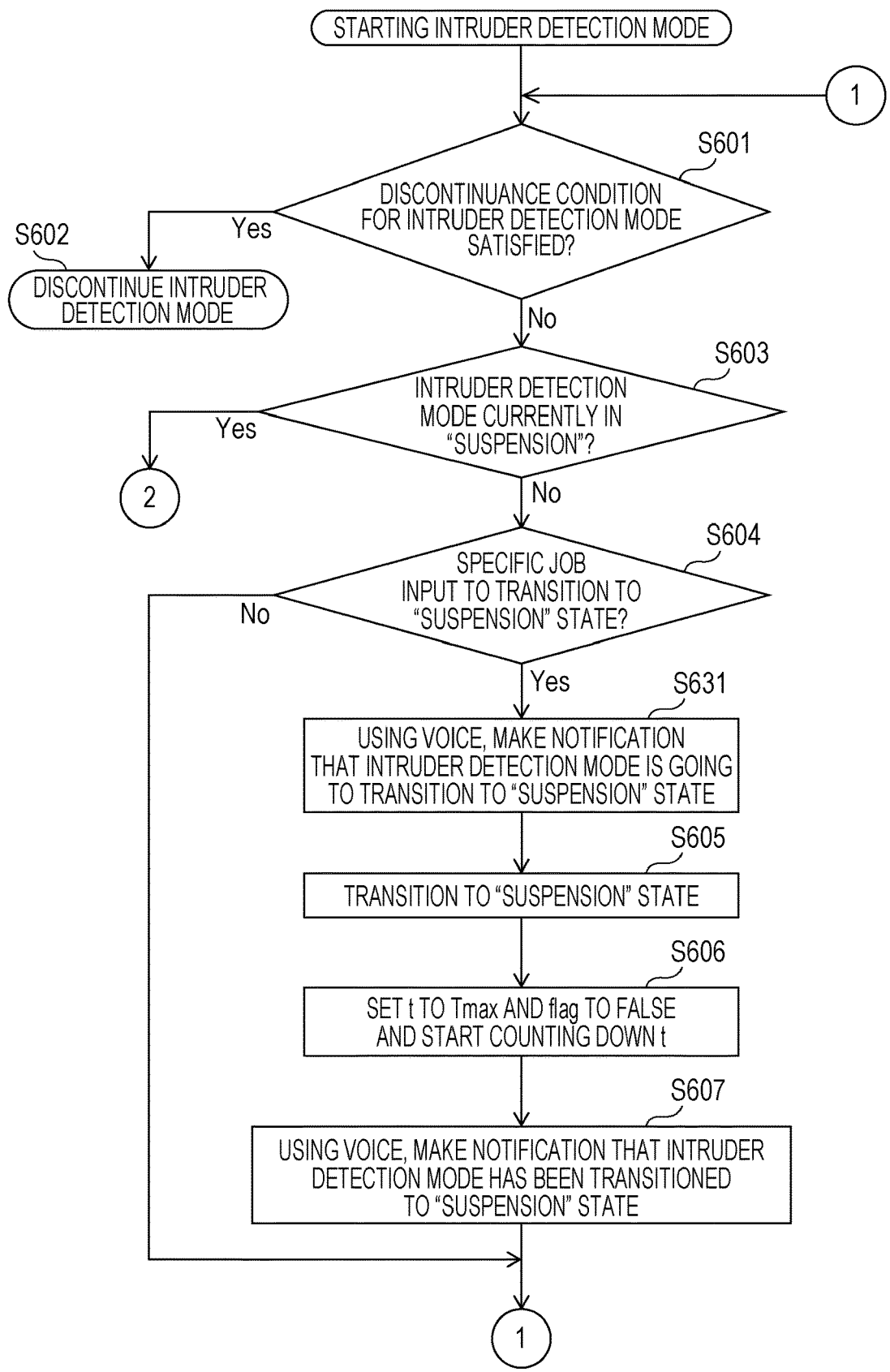
FIG. 20, corresponding to FIG. 5, illustrates the intruder detection process of a digital multifunction apparatus of an eighth embodiment of the disclosure.

The automatic control setting in the intruder detection mode of an eighth embodiment of the disclosure is described in connection with FIG. 20. FIG. 20, corresponding to FIG. 5, illustrates the intruder detection process of a digital multifunction apparatus 1 of the eighth embodiment of the disclosure.

Steps S601 through S607 of FIG. 20 respectively correspond to steps S1 through S7 of FIG. 5, and the detailed discussion thereof is omitted herein.

If the specific job is input in step S604 of FIG. 20 (yes branch from step S604), the controller 10 causes the notification unit 19 to notify the user of the transition to the "suspension" state of the intruder detection mode (step S631).

The user is thus notified that the intruder detection mode is in the suspension state. This may set the authorized user free from becoming a target about which a notification is made or a warning is issued in the intruder detection mode. The digital multifunction apparatus 1 more user-friendly than image forming apparatuses of the related art may thus result.

Ninth Embodiment

Figure 21:
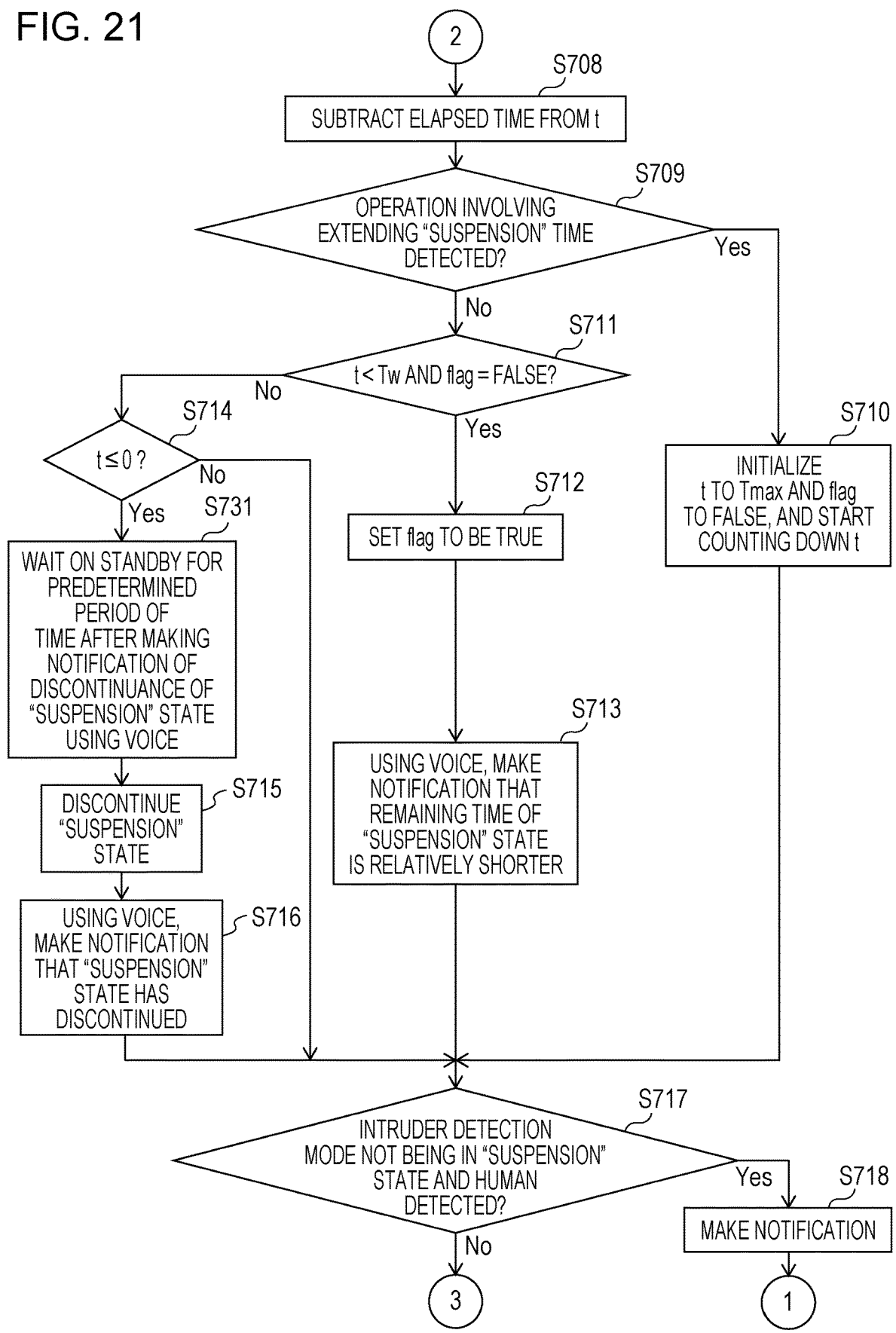
FIG. 21, corresponding to FIG. 6, illustrates the intruder detection process of a digital multifunction apparatus of a ninth embodiment of the disclosure.

The automatic control setting in the intruder detection mode of a ninth embodiment of the disclosure is described in connection with FIG. 21. FIG. 21, corresponding to FIG. 6, illustrates the intruder detection process of a digital multifunction apparatus 1 of the ninth embodiment of the disclosure.

Steps S708 through S718 of FIG. 21 respectively correspond to steps S8 through S18 of FIG. 6, and the detailed discussion thereof is omitted herein. Operation in step S731 not illustrated in FIG. 6 is described below. The process related to FIGS. 5 and 7 remains unchanged from the one discussed in connection with FIGS. 5 and 7, and the discussion thereof is omitted herein.

If the remaining time t is equal to or shorter than 0 in step S714 of FIG. 21 (yes branch from step S714), the controller 10 causes the notification unit 19 to notify the user that the "suspension" state of the intruder detection mode is going to discontinue (step S731).

The controller 10 may discontinue the "suspension" state of the intruder detection mode after a predetermined waiting time (1 to 2 minutes, for example) from the notification such that the user having received the notification retrieves the paper sheet in time.

The user is thus notified of the discontinuance of the suspension state of the intruder detection mode in this way. This may set the authorized user free from becoming a target about which a notification is made or a warning is issued in the intruder detection mode. The digital multifunction apparatus 1 more user-friendly than image forming apparatuses of the related art may thus result.

Tenth Embodiment

Figure 22:
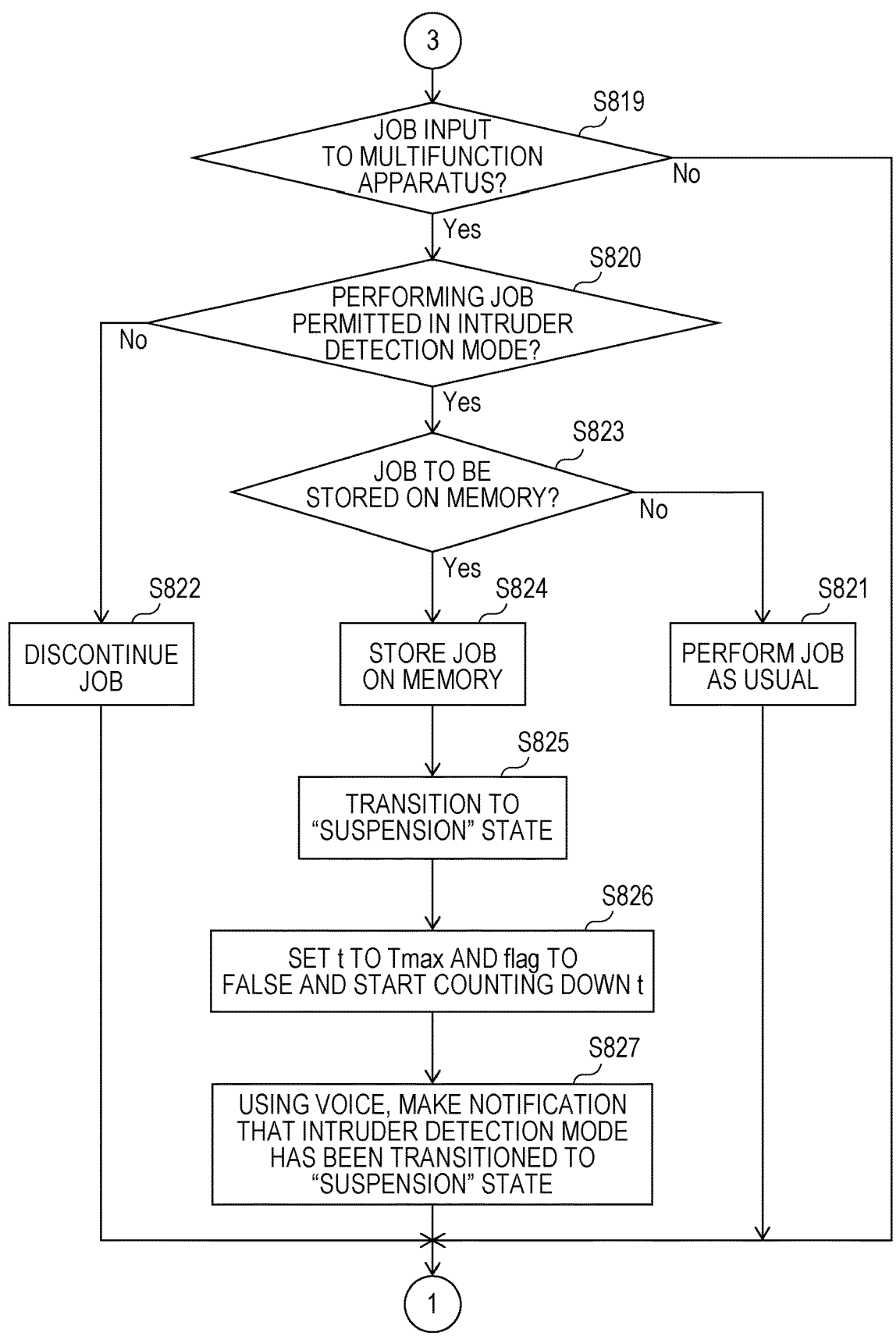
FIG. 22, corresponding to FIG. 7, illustrates the intruder detection process of a digital multifunction apparatus of a tenth embodiment of the disclosure.

The automatic control setting in the intruder detection mode of a tenth embodiment of the disclosure is described in connection with FIG. 22. FIG. 22, corresponding to FIG. 7, illustrates the intruder detection process of a digital multifunction apparatus 1 of the tenth embodiment of the disclosure.

Steps S819 through S822 and steps S825 through S827 of FIG. 22 respectively correspond to steps S19 through S22 of FIG. 7 and steps S5 through S7 of FIG. 5, and the detailed discussion thereof is omitted herein. Operations in steps S823 through S827 not illustrated in FIG. 7 are described below. The process related to FIGS. 5 and 6 remains unchanged from the one discussed in connection with FIGS. 5 and 6, and the discussion thereof is omitted herein.

According to the tenth embodiment, the print data related to the specific job may be temporarily stored on the memory 13 instead of being printed. In such a case, the controller 10 temporarily suspends the intruder detection mode such that the authorized user may not become a target about which a notification is made when he or she performs an operation such as printing the print data.

Specifically, if performing the job is permitted in the intruder detection mode in step S820 of FIG. 22 (yes branch from step S820), the controller 10 determines in step S823 whether the job is to be stored on the memory 13 (step S823).

If the job is not to be stored on the memory 13 (no branch from step S823), the controller 10 performs an operation in step S821 (step S821). On the other hand, if the job is to be stored on the memory 13 (yes branch from step S823), the controller 10 stores the job on the memory 13 in step S824 (step S824).

In step S5, the controller 10 transitions the intruder detection mode to the suspension state (step S5).

When the print data related to the specific job to be stored on the memory 13 is received in the intruder detection mode, it is likely that the authorized user approaches the digital multifunction apparatus 1.

When the authorized user approaches the digital multifunction apparatus 1 to perform the print operation of the stored print data, he or she may be free from becoming a target about which a notification is made or a warning is issued in the intruder detection mode. The digital multifunction apparatus 1 more user-friendly than image forming apparatuses of the related art may thus result.

Eleventh Embodiment

Figure 23:
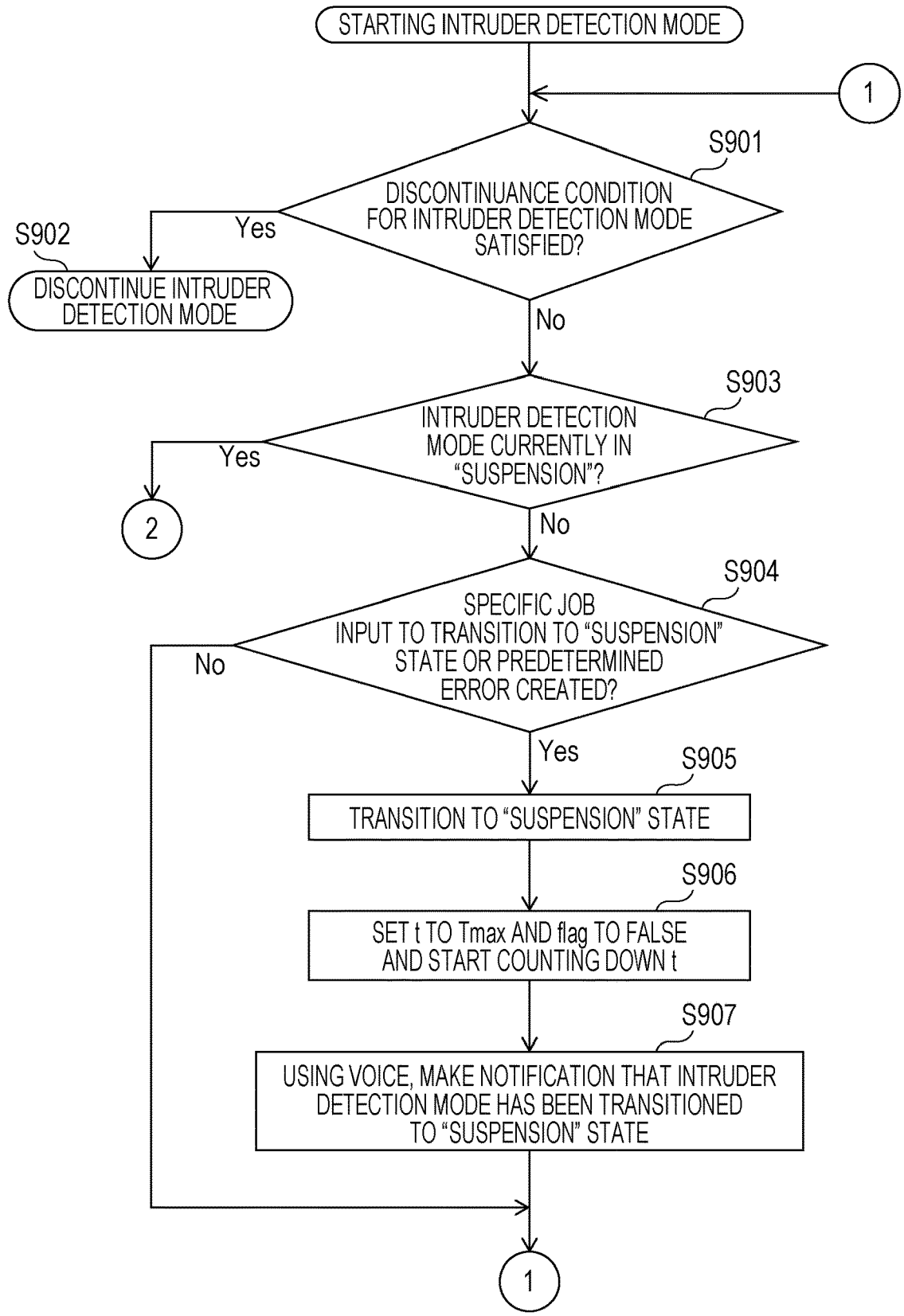
FIG. 23, corresponding to FIG. 5, illustrates the intruder detection process of a digital multifunction apparatus of an eleventh embodiment of the disclosure.

The automatic control setting in the intruder detection mode of an eleventh embodiment of the disclosure is described in connection with FIG. 23. FIG. 23, corresponding to FIG. 5, illustrates the intruder detection process of a digital multifunction apparatus 1 of the eleventh embodiment of the disclosure.

Steps S901 through S903 and steps S905 through S907 of FIG. 23 respectively correspond to steps S1 through S3 and steps S5 through S7 of FIG. 5, and the detailed discussion thereof is omitted herein. Operation in step S904 not illustrated in FIG. 5 is described below.

If the intruder detection mode is not in the suspension state in step S903 of FIG. 23 (no branch from step S903), the controller 10 determines in step S904 whether the predetermined specific job is input to transition the intruder detection mode to the suspension state or a predetermined error has been created (step S904).

The predetermined error is an error that is likely to cause the authorized user to approach the front of the digital multifunction apparatus 1. For example, the predetermined error is a paper-jamming error, an out-of-toner error or an out-of-ink error.

If the specific job is input or the predetermined error has been created (yes branch from step S904), the controller 10 transitions the intruder detection mode to the suspension state in step S905 (step S905).

Even if an error such as a paper-jamming error, an out-of-toner error or an out-of-ink error, other than the reception of the specific job, has been created possibly causing the authorized user to approach the front side of the digital multifunction apparatus 1, the authorized user is free from being a target about which a notification is made or a warning is issued in the intruder detection mode. The digital multifunction apparatus 1 more user-friendly than image forming apparatuses of the related art may thus result.

Twelfth Embodiment

Figure 24:
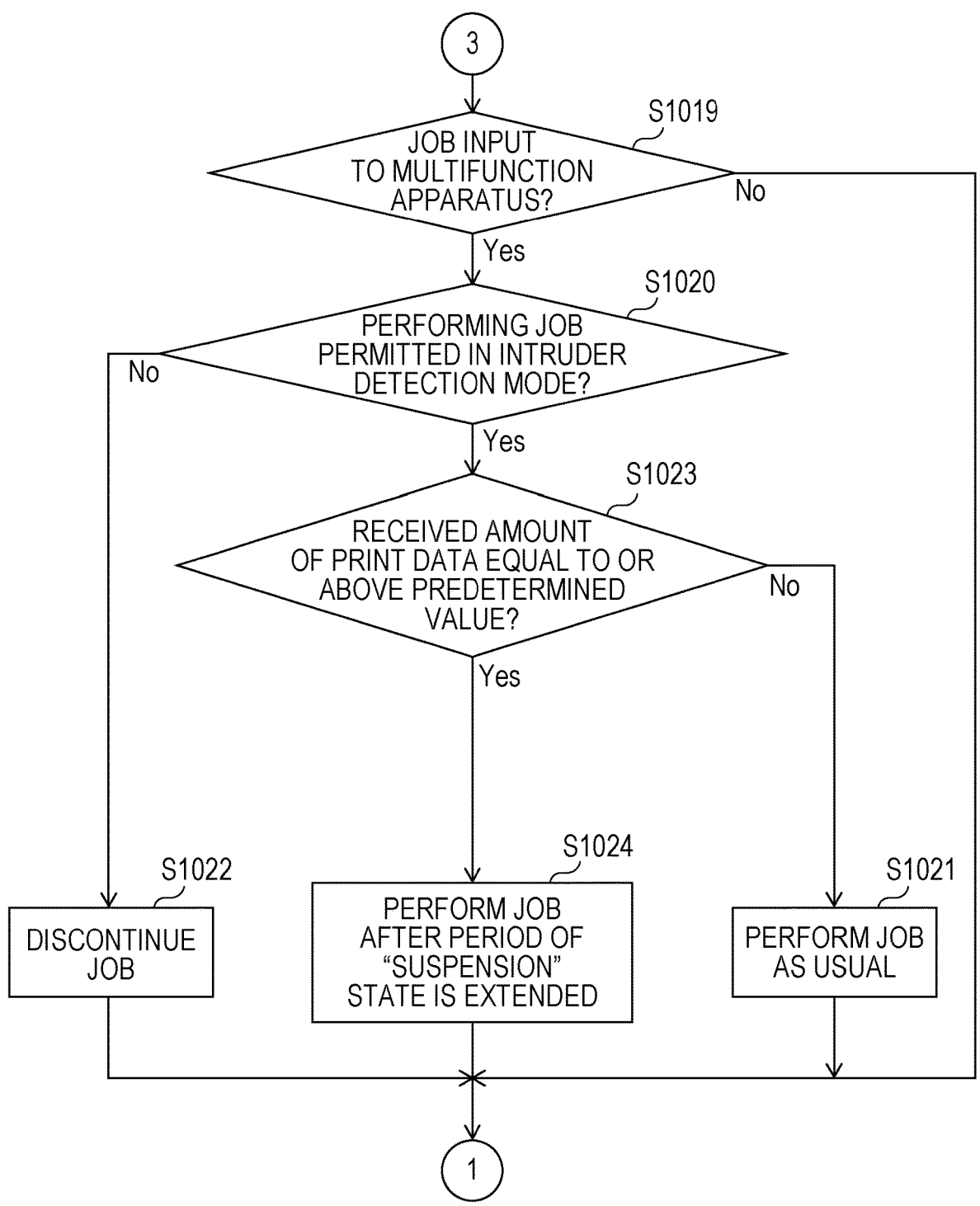
FIG. 24, corresponding to FIG. 7, illustrates the intruder detection process of a digital multifunction apparatus of a twelfth embodiment of the disclosure.

The automatic control setting in the intruder detection mode of a twelfth embodiment of the disclosure is described in connection with FIG. 24. FIG. 24, corresponding to FIG. 7, illustrates the intruder detection process of a digital multifunction apparatus 1 of the twelfth embodiment of the disclosure.

Steps S1019 through S1022 of FIG. 24 respectively correspond to steps S19 through S22 of FIG. 7, and the detailed discussion thereof is omitted herein. Operations in steps S1023 and S1024 not illustrated in FIG. 7 are described below.

If performing the job is permitted in the intruder detection mode in step S1020 of FIG. 24 (yes branch from step S1020), the controller 10 determines in step S1023 whether a received amount of print data is equal to or above a predetermined value (step S1023).

If the received amount of print data is below the predetermined value (no branch from step S1023), the controller 10 performs the job as usual (step S1021).

On the other hand, if the received amount of print data is equal to or above the predetermined value (yes branch from step S1023), the controller 10 performs the job after extending the suspension state by a predetermined time period in step S1024 (step S1024).

If a vast amount of fax data is received, the suspension state of too long time inconveniences the user. In view of the received amount of print data, the controller 10 may determine whether to extend the time length of the suspension state.

The suspension time may be varied depending on the type of the specific job.

The suspension time of the intruder detection mode may be changed in response to the amount of print data of the specific job or the type of the job. The digital multifunction apparatus 1 more user-friendly than image forming apparatuses of the related art may thus result.

The present disclosure contains subject matter related to that disclosed in Japanese Priority Patent Application JP 2018-042981 filed in the Japan Patent Office on Mar. 9, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus comprising:
    an intruder detecting sensor that detects an intruder;
    an image forming unit that forms an image;
    a memory that stores instructions; and
    a processor that executes the instructions stored in the memory to:
        notify detection of the intruder;
        execute an intruder detection mode to cause to notify the detection of the intruder if the intruder is detected with the intruder detecting sensor being operated; and
        receive an instruction to perform a job,
    wherein the intruder detection mode is suspended for a predetermined suspension time period if the instruction to perform a predetermined specific job is received while the intruder detection mode is executed.

2. The image forming apparatus according to claim 1, wherein the processor further executes an instruction to perform user authentication,
    wherein if the instruction to perform the predetermined specific job is received while the intruder detection mode is executed, the user authentication is performed, and if an authorized user is authenticated through the user authentication, the predetermined specific job is performed.

3. The image forming apparatus according to claim 1, wherein the processor further executes an instruction to receive print data from an external device,
    wherein the predetermined specific job is related to a print instruction of the print data received from the external device.

4. The image forming apparatus according to claim 1, further comprising:
    a discharge tray;
    a paper sheet sensor that detects presence or absence of a paper sheet in the discharge tray; and
    a printing unit that prints print data,
    wherein suspension of the intruder detection mode is discontinued even within the predetermined suspension time period if the paper sheet sensor no longer detects the paper sheet in the discharge tray after the printing unit has printed the print data related to the predetermined specific job.

5. The image forming apparatus according to claim 4, wherein a user is notified of a message prompting the user to retrieve the paper sheet if the paper sheet sensor detects the paper sheet in the discharge tray a fixed time period before the predetermined suspension time period of the intruder detection mode is finished.

6. The image forming apparatus according to claim 1, wherein when the intruder detection mode is executed or suspended, a user is notified of execution or suspension of the intruder detection mode.

7. The image forming apparatus according to claim 1, further comprising a scanner and, the processor further executes an instruction to receive from an external device an instruction to start up an application for the scanner,
wherein the predetermined specific job is a job that relates to the instruction to start up the application for the scanner received from the external device.

* * * * *